US012777431B2

(12) United States Patent
Rudolf et al.

(10) Patent No.: US 12,777,431 B2
(45) Date of Patent: Oct. 27, 2026

(54) POWER HEADROOM REPORTING IN FULL-DUPLEX SYSTEMS

(71) Applicant: Samsung Electronics Co., Ltd., Suwon-si (KR)

(72) Inventors: Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 18/537,733

(22) Filed: Dec. 12, 2023

(65) Prior Publication Data

US 2024/0214948 A1 Jun. 27, 2024

Related U.S. Application Data

(60) Provisional application No. 63/435,428, filed on Dec. 27, 2022.

(51) Int. Cl.
*H04W 52/36* (2009.01)
*H04L 5/14* (2006.01)
(Continued)

(52) U.S. Cl.
CPC ............ *H04W 52/365* (2013.01); *H04L 5/14* (2013.01); *H04W 72/0446* (2013.01); *H04W 72/231* (2023.01)

(58) Field of Classification Search
CPC .... H04L 5/14; H04W 52/146; H04W 52/365; H04W 72/0446; H04W 72/231
See application file for complete search history.

(56) References Cited

U.S. PATENT DOCUMENTS 8,996,055 B2 * 3/2015 Wang .................... H04W 52/58 455/69
9,002,391 B1 * 4/2015 Goyal ................ H04W 52/365 455/512
(Continued)

FOREIGN PATENT DOCUMENTS

CN 107277908 B * 6/2021 ............... H04L 5/14
CN 109314936 B * 8/2021 ............ H04W 52/54
(Continued)

OTHER PUBLICATIONS

International Search Report and Written Opinion issued Apr. 4, 2024 regarding International Application No. PCT/KR2023/021478, 7 pages.
(Continued)

*Primary Examiner* — Eric Nowlin

(57) ABSTRACT

Power headroom reporting in full-duplex systems. A method of operating a user equipment (UE) includes receiving first and second information for first and second sets of parameters for a first and second power headroom reports (PHRs) associated with first and second subsets of slots from a set of slots, respectively, and determining a power for transmission of a physical uplink shared channel (PUSCH) in a slot from the set of slots. The method further includes determining a PHR for the power based on the first set of parameters when the slot is from the first subset of slots or the second set of parameters when the slot is from the second subset of slots and transmitting the PHR based on whether a reporting condition is met. The second subset of slots includes time-domain resources indicated for simultaneous transmission and reception on the cell and the first do not.

20 Claims, 15 Drawing Sheets

(51) Int. Cl.
*H04W 72/0446* (2023.01)
*H04W 72/231* (2023.01)

(56) References Cited

U.S. PATENT DOCUMENTS

| | | | | |
|---|---|---|---|---|
| 11,044,676 | B2 * | 6/2021 | He | H04W 80/02 |
| 11,792,736 | B2 * | 10/2023 | Xu | H04W 52/243 370/277 |
| 11,997,618 | B2 * | 5/2024 | Zhang | H04W 52/42 |
| 12,015,987 | B2 * | 6/2024 | Zhang | H04L 5/16 |
| 2012/0207112 | A1 * | 8/2012 | Kim | H04W 52/545 370/328 |
| 2012/0294267 | A1 * | 11/2012 | Wang | H04W 52/58 370/329 |
| 2019/0281559 | A1 * | 9/2019 | Yi | H04W 72/56 |
| 2020/0107272 | A1 * | 4/2020 | He | H04W 52/325 |
| 2022/0110072 | A1 * | 4/2022 | Zhang | H04L 5/1423 |
| 2022/0159580 | A1 | 5/2022 | Su | |
| 2022/0232489 | A1 * | 7/2022 | Zhang | H04W 52/365 |
| 2023/0224827 | A1 * | 7/2023 | Zhang | H04B 7/0408 455/522 |
| 2023/0284155 | A1 * | 9/2023 | Shim | H04W 84/04 370/329 |
| 2023/0319725 | A1 * | 10/2023 | Ryu | H04W 52/08 370/318 |
| 2024/0007970 | A1 * | 1/2024 | Yuan | H04W 52/365 |
| 2024/0031948 | A1 * | 1/2024 | Zhang | H04B 7/0404 |
| 2024/0214947 | A1 * | 6/2024 | Park | H04L 5/0053 |
| 2024/0283619 | A1 * | 8/2024 | Nemeth | H04L 5/1461 |
| 2025/0016693 | A1 * | 1/2025 | Liu | H04W 52/367 |
| 2025/0056425 | A1 * | 2/2025 | Ling | H04W 52/365 |
| 2025/0212136 | A1 * | 6/2025 | Ling | H04W 52/08 |
| 2025/0286695 | A1 * | 9/2025 | Abotabl | H04W 52/365 |
| 2025/0294474 | A1 * | 9/2025 | Abotabl | H04W 72/231 |
| 2025/0294476 | A1 * | 9/2025 | Abotabl | H04L 5/14 |

FOREIGN PATENT DOCUMENTS

| | | | | |
|---|---|---|---|---|
| CN | 114258121 | A * | 3/2022 | H04W 52/367 |
| CN | 116325964 | A * | 6/2023 | H04W 52/367 |
| CN | 114258121 | B * | 3/2024 | H04W 52/146 |
| WO | WO-2021263253 | A1 * | 12/2021 | H04W 52/146 |
| WO | 2022031119 | A1 | 2/2022 | |
| WO | WO-2022072856 | A1 * | 4/2022 | H04W 52/146 |
| WO | WO-2022214735 | A1 * | 10/2022 | H04W 52/365 |
| WO | WO-2025227412 | A1 * | 11/2025 | H04W 52/365 |

OTHER PUBLICATIONS

Samsung, “MAC CE impacts for feMIMO”, 3GPP TSG-RAN2 Meeting #116bis Electronic, R2-2200662, Jan. 2022, 10 pages.
LG Electronics Inc., “Remaining issues on MAC”, 3GPP TSG-RAN2#118-e, R2-2204882, May 2022, 6 pages.
Apple, “mTRP PHR report procedure”, 3GPP TSG-RAN WG2 Meeting #118, R2-2205676, May 2022, 3 pages.
Samsung, “Considerations on Enhanced PHR for multiple TRP MAC CE”, 3GPP TSG-RAN WG2 Meeting #118 electronic, R2-2205205, May 2022, 5 pages.
“3rd Generation Partnership Project; Technical Specification Group Radio Access Network; NR; Physical channels and modulation (Release 17)”, 3GPP TS 38.211 V17.2.0, Jun. 2022, 136 pages.
“3rd Generation Partnership Project; Technical Specification Group Radio Access Network; NR; Multiplexing and channel coding (Release 17)”, 3GPP TS 38.212 V17.2.0, Jun. 2022, 201 pages.
“3rd Generation Partnership Project; Technical Specification Group Radio Access Network; NR; Physical layer procedures for control (Release 17)”, 3GPP TS 38.213 V17.2.0, Jun. 2022, 256 pages.
“3rd Generation Partnership Project; Technical Specification Group Radio Access Network; NR; Physical layer procedures for data (Release 17),” 3GPP TS 38.214 V17.2.0 , Jun. 2022, 228 pages.
“5G; NR; Medium Access Control (MAC) protocol specification (3GPP TS 38.321 version 17.1.0 Release 17)”, ETSI TS 138 321 V17.1.0 , Aug. 2022, 244 pages.
“5G; NR; Radio Resource Control (RRC); Protocol specification (3GPP TS 38.331 version 17.1.0 Release 17)”, ETSI TS 138 331 V17.1.0, Aug. 2022, 1257 pages.
“5G; NR; User Equipment (UE) radio access capabilities (3GPP TS 38.306 version 17.1.0 Release 17)”, ETSI TS 138 306 V17.1.0, Aug. 2022, 226 pages.
“3rd Generation Partnership Project; Technical Specification Group Radio Access Network; NR; User Equipment (UE) radio transmission and reception; Part 1: Range 1 Standalone (Release 17)”, 3GPP TS 38.101-1 V17.3.0, Sep. 2019, 583 pages.
“3rd Generation Partnership Project; Technical Specification Group Radio Access Network; NR; User Equipment (UE) radio transmission and reception; Part 2: Range 2 Standalone (Release 17)”, 3GPP TS 38.101-2 V17.3.0, Sep. 2019, 186 pages.
“3rd Generation Partnership Project; Technical Specification Group Radio Access Network; NR; User Equipment (UE) radio transmission and reception; Part 3: Range 1 and Range 2 Interworking operation with other radios (Release 17)”, 3GPP TS 38.101-3 V17.3.0, Sep. 2019, 847 pages.
“3rd Generation Partnership Project; Technical Specification Group Radio Access Network; NR; Requirements for support of radio resource management (Release 17)”, 3GPP TS 38.133 V17.2.0, Jun. 2021, 3177 pages.
Supplementary European Search Report dated Mar. 11, 2026, in connection with European Patent Application No. 23912832.5, 10 pages.
“5G; NR; Physical layer procedures for control (3GPP TS 38.213 version 17.3.0 Release 17),” ETSI TS 138 213 V17.3.0, Sep. 2022, 262 pages.
“5G; NR; Medium Access Control (MAC) protocol specification (3GPP TS 38.321 version 17.2.0 Release 17),” ETSI TS 138 321 V17.2.0, Oct. 2022, 248 pages.
“5G; NR; Radio Resource Control (RRC); Protocol specification (3GPP TS 38.331 version 17.2.0 Release 17),” ETSI TS 138 331 V17.2.0, Oct. 2022, 1277 pages.

* cited by examiner

POWER HEADROOM REPORTING IN FULL-DUPLEX SYSTEMS

CROSS-REFERENCE TO RELATED AND CLAIM OF PRIORITY

The present application claims priority under 35 U.S.C. § 119(e) to: U.S. Provisional Patent Application No. 63/435,428 filed on Dec. 27, 2022, which is hereby incorporated by reference in its entirety.

TECHNICAL FIELD

The present disclosure relates generally to wireless communication systems and, more specifically, the present disclosure is related to apparatuses and methods for power headroom reporting in full-duplex (FD) systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to power headroom reporting in FD systems.

In an embodiment, a method of operating a user equipment (UE) is provided. The method includes receiving first information for a first set of parameters for a first power headroom report (PHR) associated with a first subset of slots from a set of slots on a cell; receiving second information for a second set of parameters for a second PHR associated with a second subset of slots from the set of slots on the cell; and determining a power for transmission of a physical uplink shared channel (PUSCH) in a slot from the set of slots. The method further includes determining a PHR for the power based on (i) the first set of parameters when the slot is from the first subset of slots or (ii) the second set of parameters when the slot is from the second subset of slots and transmitting a medium access control (MAC) control element (CE) including the PHR based on whether a reporting condition is met. The first subset of slots does not include time-domain resources indicated for simultaneous transmission and reception on the cell. The second subset of slots includes time-domain resources indicated for simultaneous transmission and reception on the cell.

In another embodiment, a UE is provided. The UE includes a transceiver configured to receive first information for a first set of parameters for a first PHR associated with a first subset of slots from a set of slots on a cell and receive second information for a second set of parameters for a second PHR associated with a second subset of slots from the set of slots on the cell. The UE further includes a processor operably coupled with the transceiver. The processor is configured to determine a power for transmission of a PUSCH in a slot from the set of slots, and determine a PHR for the power based on (i) the first set of parameters when the slot is from the first subset of slots or (ii) the second set of parameters when the slot is from the second subset of slots. The transceiver is further configured to transmit a MAC CE including the PHR based on whether a reporting condition is met. The first subset of slots does not include time-domain resources indicated for simultaneous transmission and reception on the cell. The second subset of slots includes time-domain resources indicated for simultaneous transmission and reception on the cell.

In yet another embodiment, a base station (BS) is provided. The BS includes a processor and a transceiver operably coupled with the processor. The transceiver configured to transmit first information for a first set of parameters for a first PHR associated with a first subset of slots from a set of slots on a cell, transmit second information for a second set of parameters for a second PHR associated with a second subset of slots from the set of slots on the cell, and receive, based on whether a reporting condition is met, a MAC CE including a PHR for a power for a PUSCH in a slot from the set of slots. The PHR is based on (i) the first set of parameters when the slot is from the first subset of slots or (ii) the second set of parameters when the slot is from the second subset of slots. The first subset of slots does not include time-domain resources indicated for simultaneous transmission and reception on the cell. The second subset of slots includes time-domain resources indicated for simultaneous transmission and reception on the cell.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
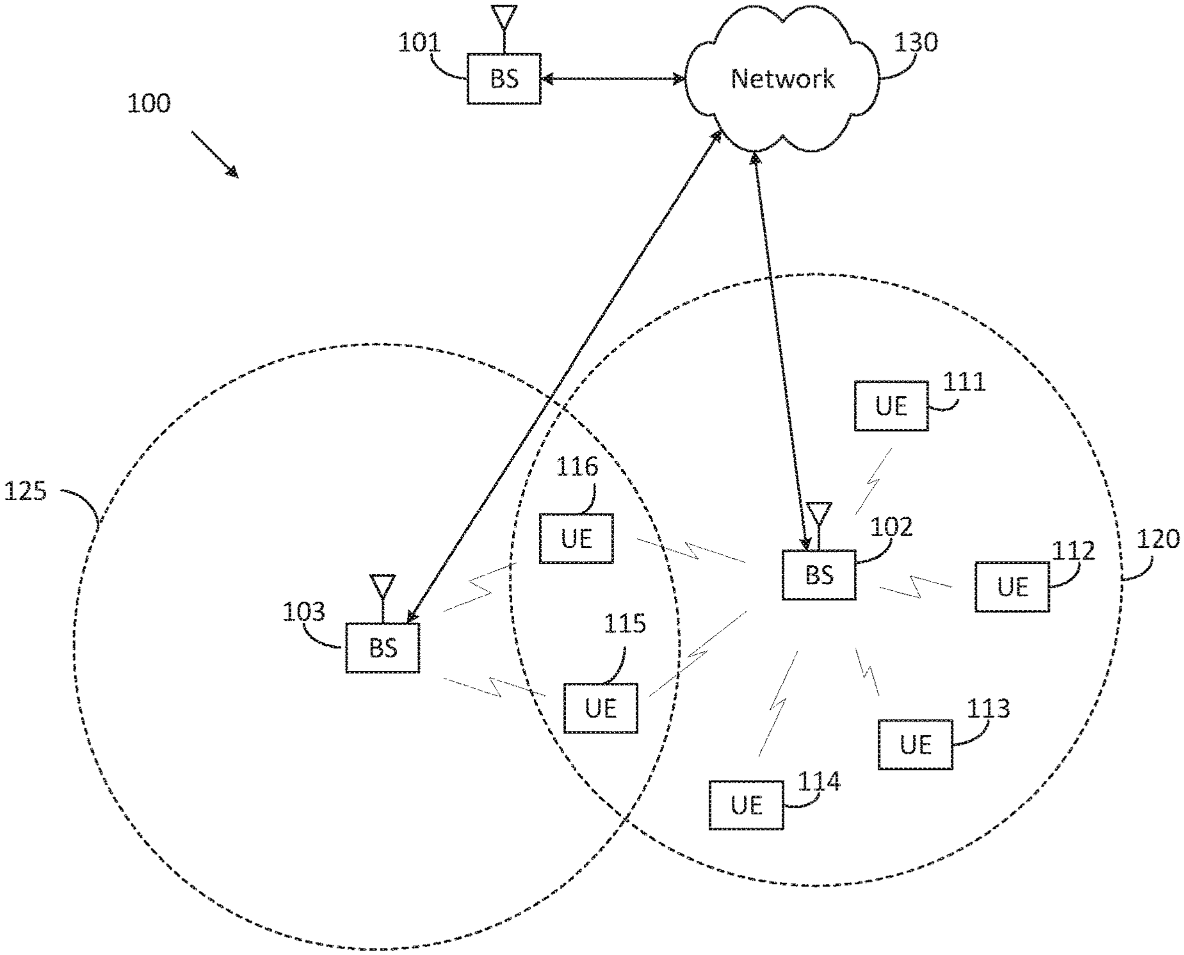
FIG. 1 illustrates an example wireless network according to embodiments of the present disclosure.

FIGS. 1-15, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: 3GPP TS 38.211 v17.2.0, "NR; Physical channels and modulation" (REF1); 3GPP TS 38.212 v17.2.0, "NR; Multiplexing and Channel coding" (REF2); 3GPP TS 38.213 v17.2.0, "NR; Physical Layer Procedures for Control" (REF3); 3GPP TS 38.214 v17.2.0, "NR; Physical Layer Procedures for Data" (REF4); 3GPP TS 38.321 v17.1.0, "NR; Medium Access Control (MAC) protocol specification" (REF5); 3GPP TS 38.331 v17.1.0, "NR; Radio Resource Control (RRC) Protocol Specification" (REF6); 3GPP TS 38.306 v17.1.0, "NR; User Equipment (UE) radio access capabilities" (REF7); 3GPP TS 38.101-1 Rel-17 v17.3.0, "NR; User Equipment (UE) radio transmission and reception; Part 1: Range 1 Standalone" ("REF8"); 3GPP TS 38.101-2 Rel-17 v17.3.0, "NR; User Equipment (UE) radio transmission and reception; Part 2: Range 2 Standalone" ("REF9"); 3GPP TS 38.101-3 Rel-17 v17.3.0, "NR; User Equipment (UE) radio transmission and reception; Part 3: Range 1 and Range 2 Interworking operation" ("REF10"); and 3GPP TS 38.133 v17.2.0, "NR; Requirements for support of radio resource management" (REF11).

Figure 2:
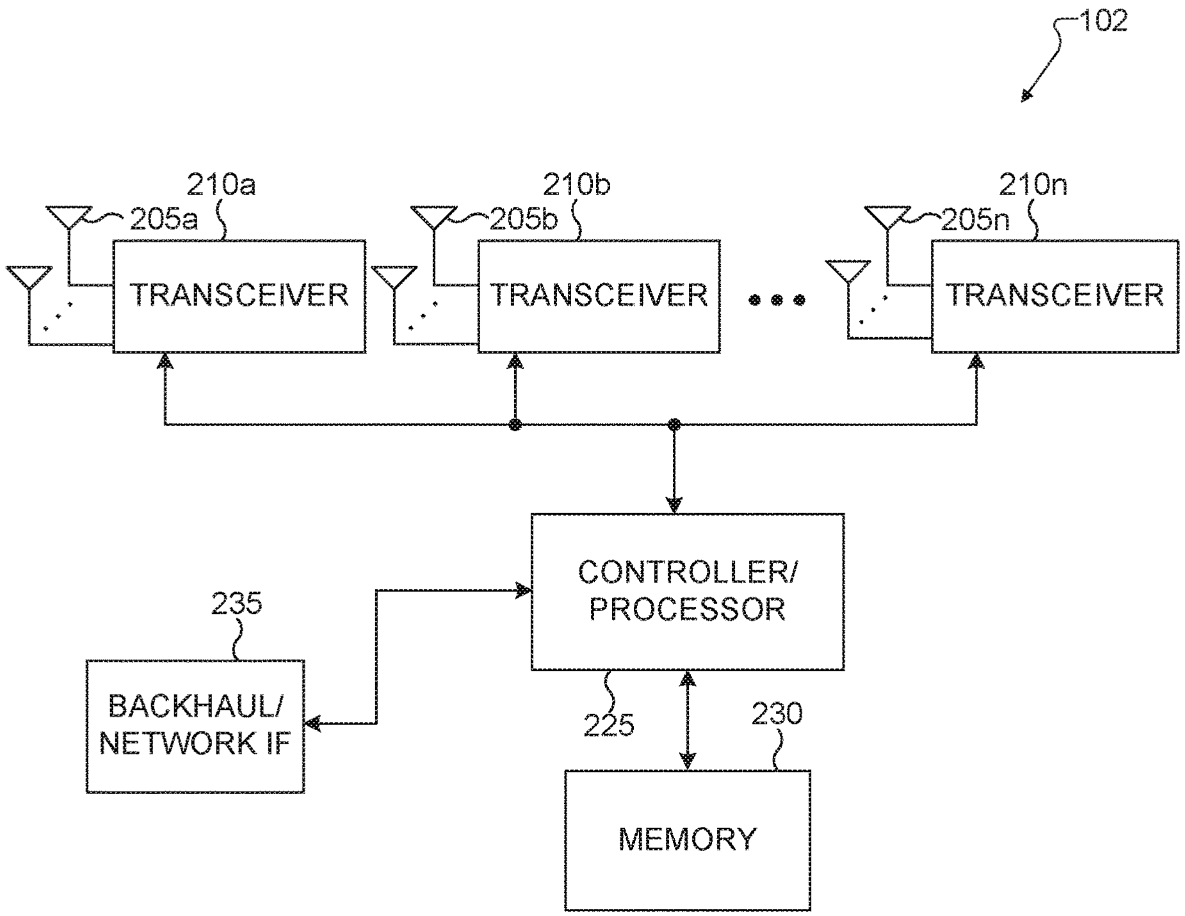
FIG. 2 illustrates an example gNodeB (gNB) according to embodiments of the present disclosure.
Figure 3:
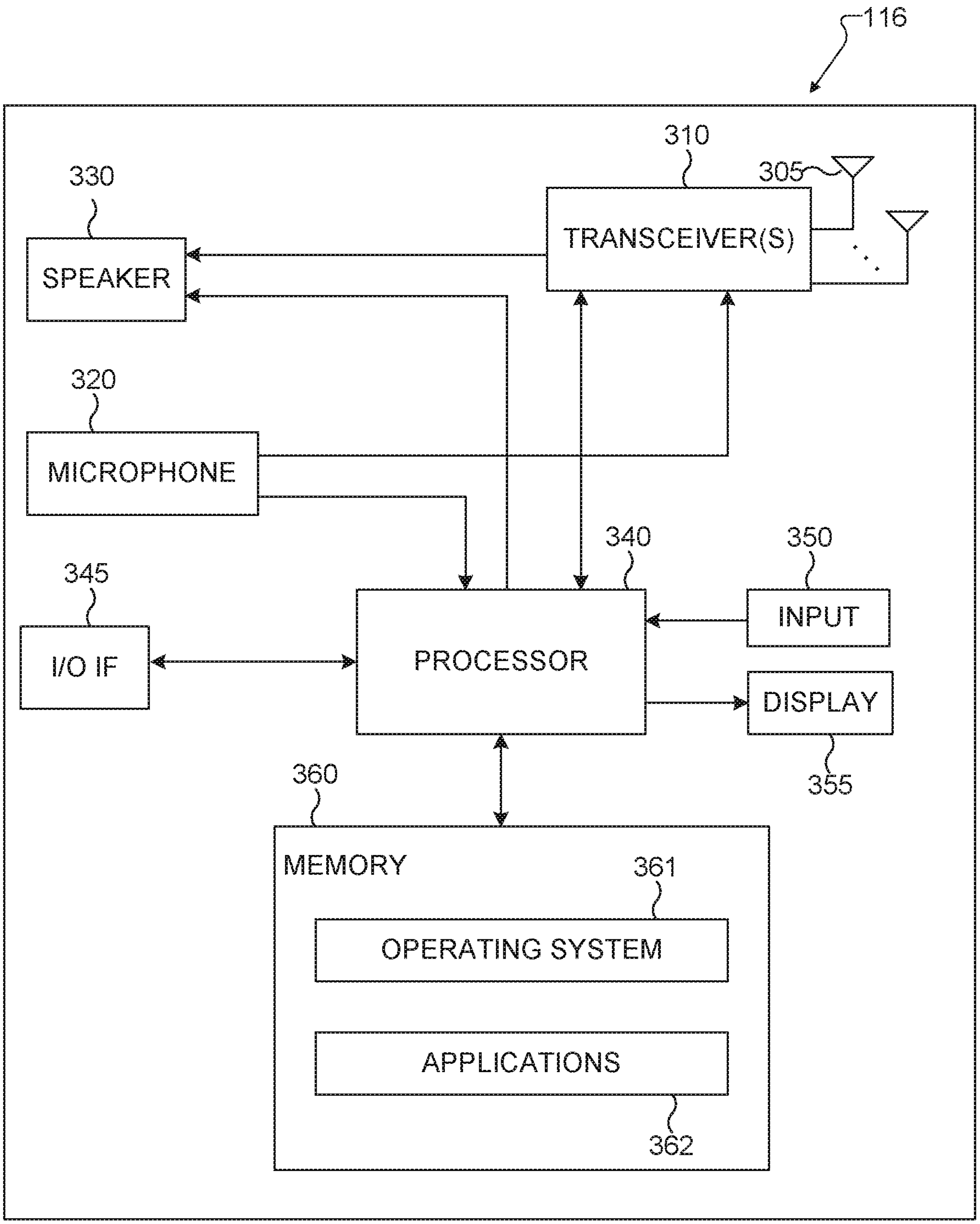
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for power headroom reporting in FD systems. In certain embodiments, one or more of the BSs 101-103 include circuitry, programing, or a combination thereof to support power headroom reporting in FD systems.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205***a*-205*n* are weighted differently to effectively steer the outgoing signals in a desired direction. As another example, the controller/processor 225 could support methods for power headroom reporting in FD systems as described in greater detail below. Any of a wide variety of other functions could be supported in the gNB 102 by the controller/processor 225. The controller/processor 225 can move data into or out of the memory 230 as required by an executing process.

The controller/processor 225 is also capable of executing programs and other processes resident in the memory 230, such as processes to support power headroom reporting in FD systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for power headroom reporting in FD systems as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
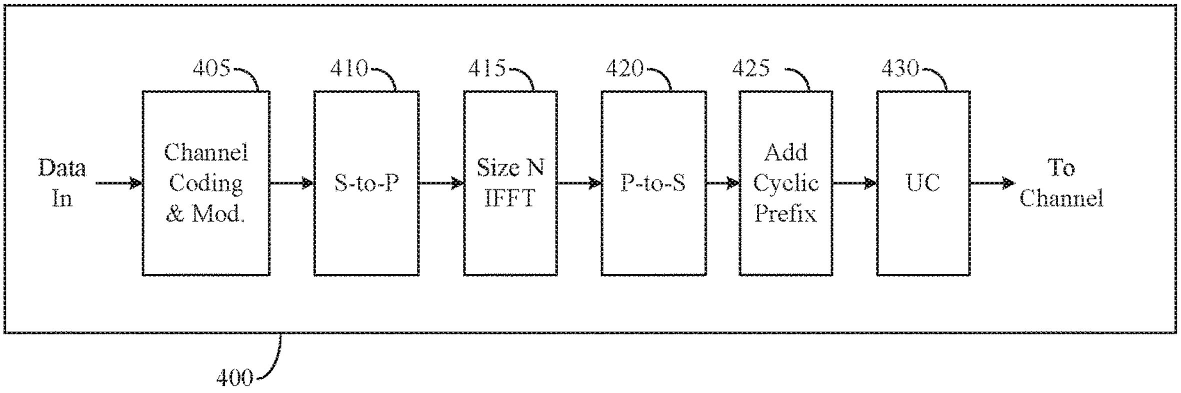
FIGS. 4A and 4B illustrate an example of a wireless transmit and receive paths according to embodiments of the present disclosure.
Figure 4B:
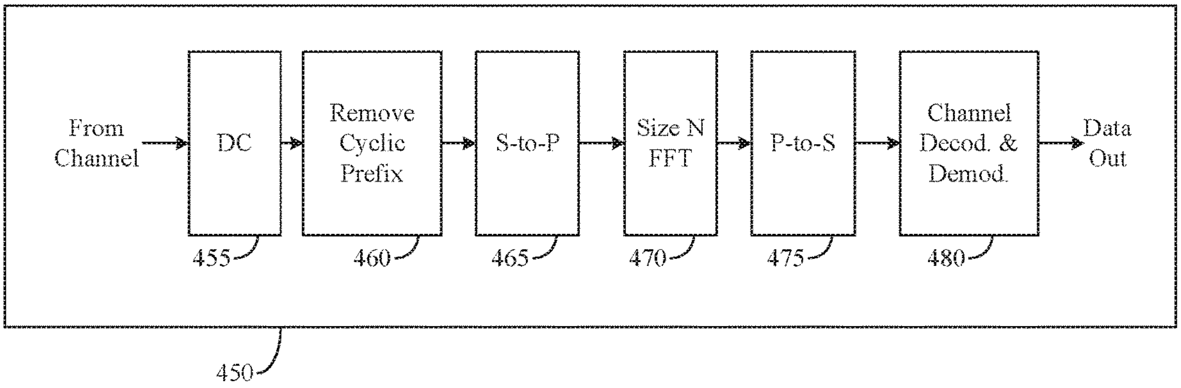

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to receive information for power headroom reporting in FD systems as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE (such as the UE 116) can determine CSI-RS transmission parameters through DL control signaling or higher layer signaling, such as radio resource control (RRC) signaling, from a gNB (such as the BS 102). Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

In certain embodiments, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA (see also NR specification). A UE transmits data information or UCI through a respective PUSCH or a physical UL control channel (PUCCH). A PUSCH or a PUCCH can be transmitted over a variable number of slot symbols including one slot symbol. The gNB can configure the UE to transmit signals on a cell within an active UL bandwidth part (BWP) of the cell UL BW.

UCI includes HARQ acknowledgement (ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE may not assume quasi co-location for any other synchronization signal SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same code division multiplexing (CDM) group is quasi co-located with respect to Doppler shift, Doppler spread, average delay, delay spread, and spatial Rx. The UE may also assume that DM-RS ports associated with a PDSCH are QCL with QCL type A, type D (when applicable) and average gain. The UE may further assume that no DM-RS collides with the SS/PBCH block.

The UE can be configured with a list of up to M transmission configuration indication (TCI) State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi-co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi-co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $$\left(n + 3N_{slot}^{subframe,\mu}\right).$$

Figure 5:
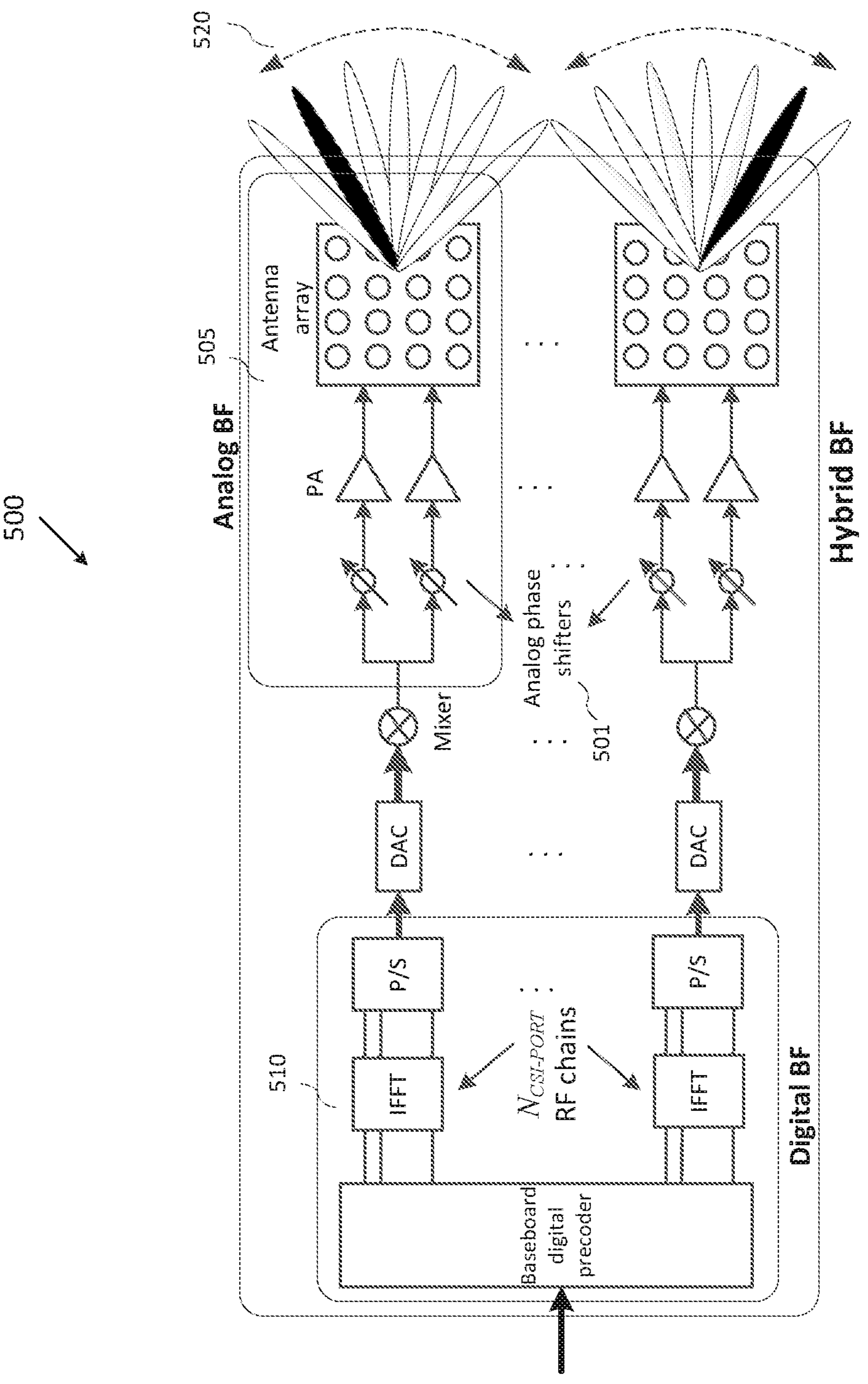
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antenna 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 channel state information reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports NCSI-PORT. A digital beamforming unit 510 performs a linear combination across NCSI-PORT analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term “multi-beam operation” is used to refer to the overall system aspect. This includes, for the purpose of illustration, indicating the assigned DL or UL TX beam (also termed “beam indication”), measuring at least one reference signal for calculating and performing beam reporting (also termed “beam measurement” and “beam reporting”, respectively), and receiving a DL or UL transmission via a selection of a corresponding RX beam. The system of FIG. 5 is also applicable to higher frequency bands such as >52.6 GHz (also termed frequency range 2-2 or FR2-2). In this case, the system can employ only analog beams. Due to the O2 absorption loss around 60 GHz frequency (~10 dB additional loss per 100 m distance), a larger number and narrower analog beams (hence a larger number of radiators in the array) are necessary to compensate for the additional path loss.

In certain embodiments, 5G NR radio supports time-division duplex (TDD) operation and frequency division duplex (FDD) operation. Use of FDD or TDD depends on the NR frequency band and per-country allocations. TDD is required in most bands above 2.5 GHZ.

Figure 6:
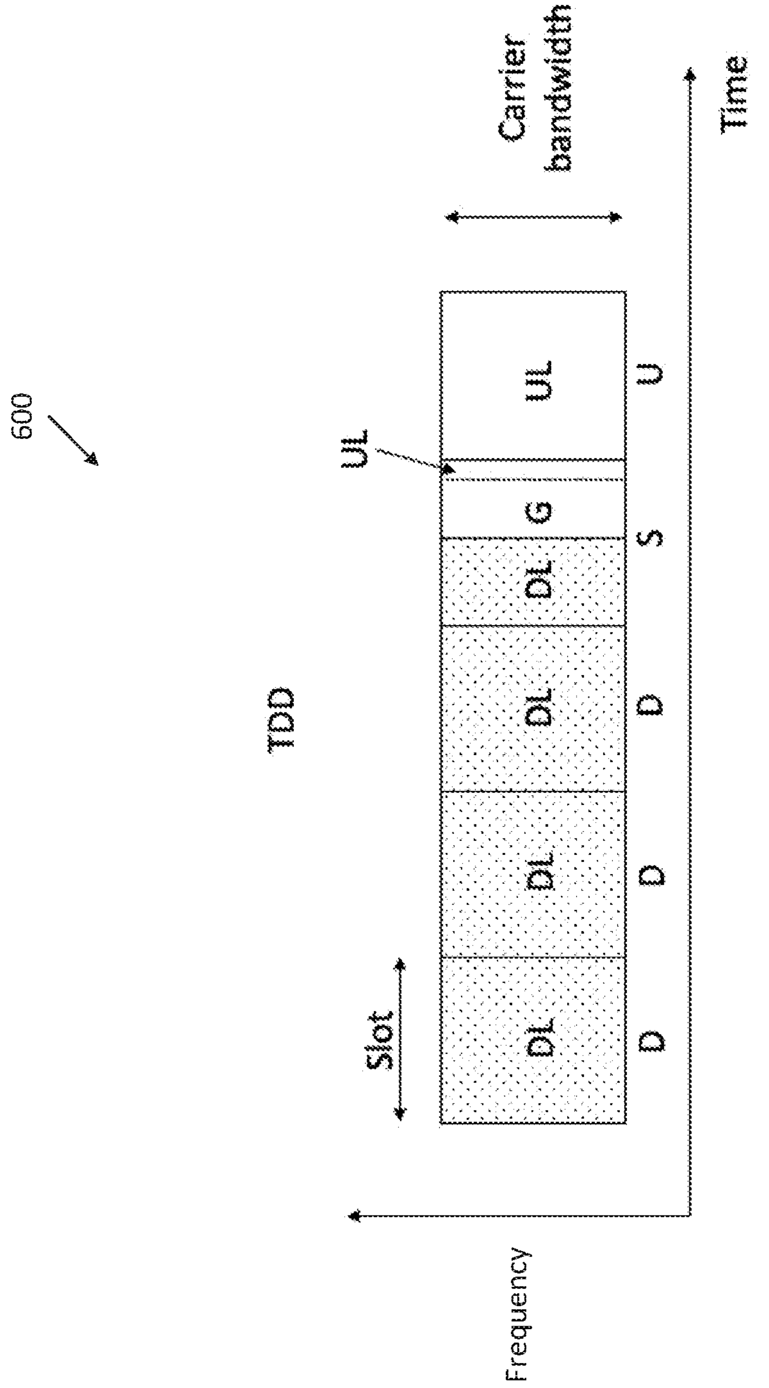
FIG. 6 illustrates a timeline of an example time division duplex (TDD) configuration according to embodiments of the present disclosure.

FIG. 6 illustrates a timeline 600 of an example TDD configuration. For example, timeline 600 of an example TDD configuration can be utilized by the BS 102 of FIG. 1 and the UE 116 of FIG. 3. This example is for illustration only and other embodiments can be used without departing from the scope of the present disclosure.

With reference to FIG. 6, A DDDSU UL-DL configuration is shown. Here, D denotes a DL slot, U denotes an UL slot, and S denotes a special or switching slot with a DL part, a flexible part that can also be used as guard period G for DL-to-UL switching, and optionally an UL part.

TDD has a number of advantages over FDD. For example, use of the same band for DL and UL transmissions leads to simpler UE implementation with TDD because a duplexer is not required. Another advantage is that time resources can be flexibly assigned to UL and DL evaluating an asymmetric ratio of traffic in both directions. DL is typically assigned most time resources in TDD to handle DL-heavy mobile traffic. Another advantage is that CSI can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the smaller portion of time resources available for transmissions from a UE, while with FDD all time resources can be used. Another disadvantage is latency. In TDD, a timing gap between reception by a UE and transmission from a UE containing the hybrid automatic repeat request acknowledgement (HARQ-ACK) information associated with receptions by the UE is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a physical uplink control channel (PUCCH) providing HARQ-ACK information needs to be transmitted with repetitions in order to improve coverage (an alternative in such case is for a network to forgo HARQ-ACK information at least for some transport blocks in the DL).

To address some of the disadvantages for TDD operation, an adaptation of link direction based on physical layer signaling using a downlink control information (DCI) format is supported. With the exception of some symbols in some slots supporting predetermined transmissions, such as for synchronization signal blocks (SSBs), symbols of a slot or in a subband can have a flexible direction (UL or DL) that a UE can determine according to scheduling information for transmissions or receptions. A physical downlink control channel (PDCCH) can also be used to provide a DCI format, such as a DCI format 2_0 as described in REF3, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross link interference (CLI) where, for example, DL receptions in a cell by a UE can experience large interference from UL transmissions in the same or neighboring cells from other UEs.

FD communications offer a potential for increased spectral efficiency, improved capacity, and reduced latency in wireless networks. When using FD communications, a gNB or a UE simultaneously receives and transmits on fully or partially overlapping, or adjacent, frequency resources, thereby improving spectral efficiency and reducing latency in user and/or control planes.

There are several options for operating a FD wireless communication system. For example, a single carrier may be used such that transmissions and receptions are scheduled on same time-domain resources, such as symbols or slots.

Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

When a UE receives signals/channels from a gNB in a full-duplex slot, the receptions may be scheduled in a DL subband of the full-duplex slot. When full-duplex operation at the gNB uses DL slots for scheduling transmissions from the UE using full-duplex transmission and reception at the gNB, there may be one or multiple, such as two, DL subbands in the full-duplex slot. When a UE is scheduled to transmit in a full-duplex slot, the transmission may be scheduled in an UL subband of the full-duplex slot. When full-duplex operation at the gNB uses UL slots for purpose of scheduling transmissions to UEs using full-duplex transmission and reception at the gNB, there may be one or multiple, such as two, UL subbands in the full-duplex slot. Full-duplex operation using an UL subband or a DL subband may be referred to as Subband-Full-Duplex (SBFD).

For example, when full-duplex operation at the gNB uses a DL or F slot or symbol for scheduling transmissions from the UE using full-duplex transmission and reception at the gNB, there may be one DL subband on the full-duplex slot or symbol and one UL subband of the full-duplex slot or symbol in the NR carrier. A frequency-domain configuration of the DL and UL subbands may then be referred to as 'DU' or 'UD', respectively, depending on whether the UL subband is configured/indicated in the upper or the lower part of the NR carrier. In another example, when full-duplex operation at the gNB uses a DL or F slot or symbol for scheduling transmissions from the UE using full-duplex transmission and reception at the gNB, there may be two, DL subbands and one UL subband on the full-duplex slot or symbol. A frequency-domain configuration of the DL and UL subbands may then be referred to as 'DUD' when the UL subband is configured/indicated in a part of the NR carrier and the DL subbands are configured/indicated at the edges of the NR carrier, respectively.

In the following, for brevity, full-duplex slots/symbols and SBFD slots/symbols may be jointly referred to as SBFD slots/symbol and non-full-duplex slots/symbols and normal DL or UL slot/symbols may be referred to as non-SBFD slots/symbols.

Instead of using a single carrier, it is also possible to use different component carriers (CCs) for receptions and transmissions by a UE. For example, receptions by a UE can occur on a first CC and transmissions by the UE 116 occur on a second CC having a small, including zero, frequency separation from the first CC. For example, when carrier-aggregation based full-duplex operation is used, an SBFD subband may correspond to a component carrier or a part of a component carrier or an SBFD subband may be allocated using parts of multiple component carriers.

In one example, the gNB may support full-duplex operation, e.g., support simultaneous DL transmission to a UE in an SBFD DL subband and UL reception from a UE in an SBFD UL subband on an SBFD slot or symbol. In one example, the gNB-side may support full-duplex operation using multiple TRPs, e.g., TRP A may be used for simultaneous DL transmission to a UE and TRP B for UL reception from a UE on an SBFD slot or symbol.

Full-duplex operation may be supported by a half-duplex UE or by a full-duplex UE. A UE operating in half-duplex mode can transmit or receive but cannot simultaneously transmit and receive on a same symbol. A UE operating in full-duplex mode can simultaneously transmit and receive on a same symbol. For example, a UE can operate in full-duplex mode on a single NR carrier or based on the use of intra-band or inter-band carrier aggregation.

For example, when the UE is capable of full-duplex operation, SBFD operation based on overlapping or non-overlapping subbands or using one or multiple UE antenna panels may be supported by the UE. In one example, an FR2-1 UE may support simultaneous transmission to the gNB and reception from the gNB on a same time-domain resource, e.g., symbol or slot. The UE capable of full-duplex operation may then be configured, scheduled, assigned or indicated with DL receptions from the gNB in an SBFD DL subband on a same SBFD symbol where the UE is configured, scheduled, assigned or indicated for UL transmissions to the gNB on an SBFD UL subband. In one example, the DL receptions by a UE may use a first UE antenna panel while the UL transmissions from the UE may use a second UE antenna panel on the same SBFD symbol/slot. For example, UE-side self-interference cancellation capability may be supported in the UE by one or a combination of techniques as described in the gNB case, e.g., based on spatial isolation provided by the UE antennas or UE antenna panels, or based on analog and/or digital equalization, or filtering. In one example, DL receptions by the UE in a first frequency channel, band or frequency range, may use a TRX of a UE antenna or UE antenna panel while the UL transmissions from the UE in a second frequency channel, band or frequency range may use the TRX on a same SBFD symbol/slot. For example, when the UE is capable of full-duplex operation based on the use of carrier aggregation, simultaneous DL reception from the gNB and UL transmission to the gNB on a same symbol may occur on different component carriers.

In the following, for brevity, a UE operating in half-duplex mode but supporting a number of enhancements for gNB-side full-duplex operation may be referred to as SBFD-aware UE. For example, the SBFD-aware UE may support time-domain or frequency-domain resource allocation enhancements to improve the UL coverage or throughput or spectral efficiency when operating on a serving cell with gNB-side SBFD support.

In the following, for brevity, a UE operating in full-duplex mode may be referred to as SBFD-capable UE, or as full-duplex capable UE, or as a full-duplex UE. A full-duplex UE may support a number of enhancements for gNB-side full-duplex operation. For example, the SBFD-capable UE may support time-domain or frequency-domain resource allocation enhancements to improve the UL coverage or throughput or spectral efficiency when operating on a serving cell.

In one example, a gNB may operate in full-duplex (or SBFD) mode and a UE operates in half-duplex mode. In one example, a gNB may operate in full-duplex (or SBFD) mode and a UE operates in full-duplex (or SBFD) mode. In one example, gNB-side support of full-duplex (or SBFD) operation is based on multiple TRPs wherein a TRP may operate in half-duplex mode, and a UE operates in full-duplex mode.

In one example, a TDD serving cell supports a mix of full-duplex and half-duplex UEs. For example, UE1 supports full-duplex operation and UE2 supports half-duplex operation. The UE1 can transmit and receive simultaneously in a slot or symbol when configured, scheduled, assigned or indicated by the gNB. UE2 can either transmit or receive in a slot or symbol while simultaneous DL reception by UE2 and UL transmission from UE2 cannot occur on the same slot or symbol.

FD transmission/reception is not limited to gNBs, TRPs, or UEs, but can also be used for other types of wireless nodes such as relay or repeater nodes.

Embodiments of the present disclosure recognize full duplex operation needs to overcome several challenges in order to be functional in actual deployments. When using overlapping frequency resources, received signals are subject to co-channel CLI and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the present disclosure, the term Full-Duplex (FD) is used as a short form for a full-duplex operation in a wireless system. The terms Cross-Division-Duplex (XDD) and FD may be used interchangeably in the present disclosure.

FD operation in NR can improve spectral efficiency, link robustness, capacity, and latency of UL transmissions. In an NR TDD system, transmissions from a UE are limited by fewer available transmission opportunities than receptions by the UE 116. For example, for NR TDD with subcarrier spacing (SCS)=30 kHz, DDDU (2 msec), DDDSU (2.5 msec), or DDDDDDDSUU (5 msec), the UL-DL configurations allow for an DL:UL ratio from 3:1 to 4:1. Any transmission from the UE 116 can only occur in a limited number of UL slots, for example every 2, 2.5, or 5 msec, respectively.

Figure 7:
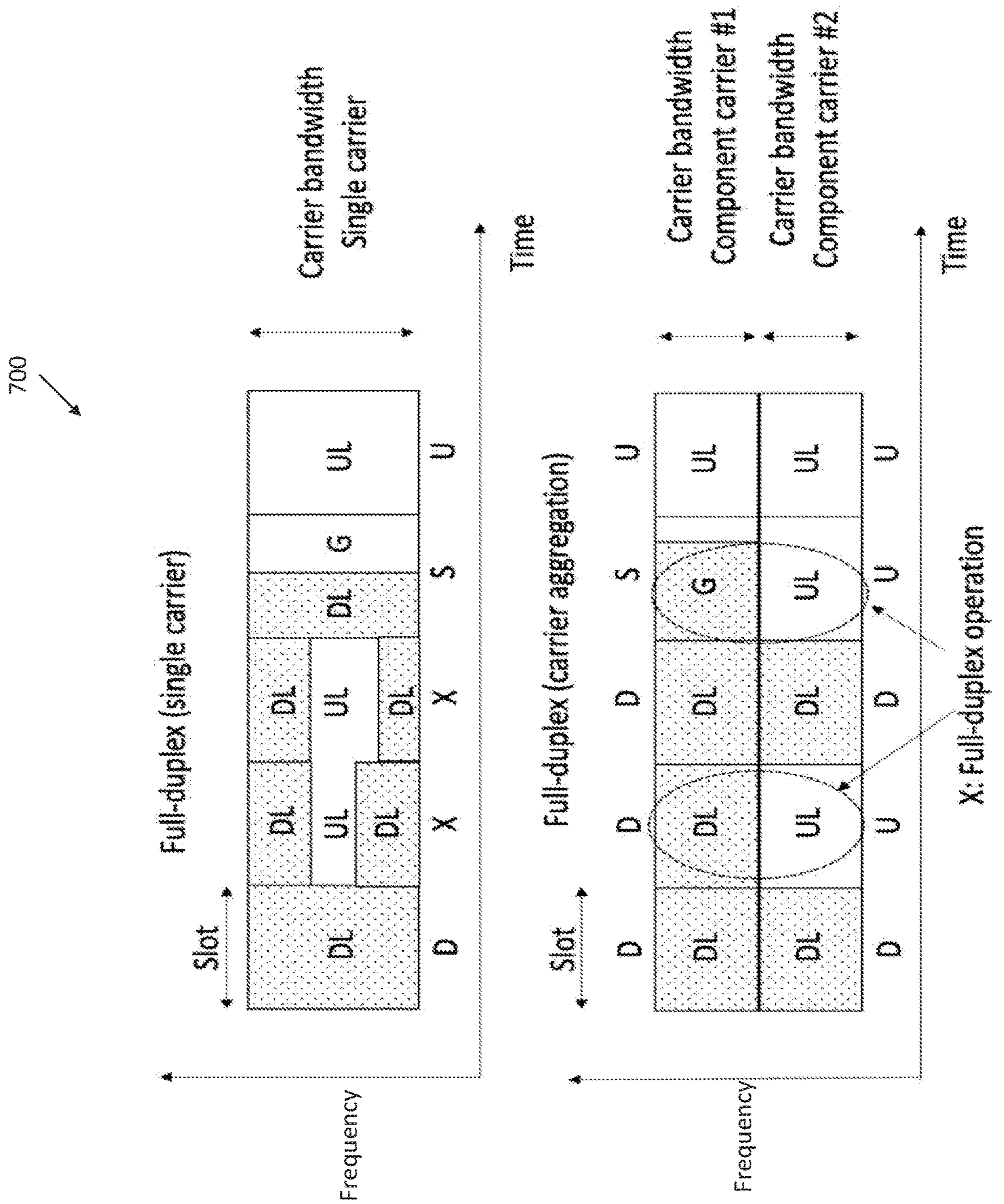
FIG. 7 illustrates timelines of example FD configurations according to embodiments of the present disclosure.

FIG. 7 illustrates timelines 700 of example FD configurations according to embodiments of the present disclosure. For example, timelines 700 can be utilized by the BS 102 of FIG. 1 and the UE 116 of FIG. 3. This example is for illustration only and other embodiments can be used without departing from the scope of the present disclosure.

For a single carrier TDD configuration with FD enabled, slots denoted as X are FD slots. Both DL and UL transmissions can be scheduled in FD slots for at least one or more symbols. The term FD slot is used to refer to a slot where UEs can simultaneously receive and transmit in at least one or more symbols of the slot if scheduled or assigned radio resources by the base station. A half-duplex UE cannot transmit and receive simultaneously in a FD slot or on a symbol of a FD slot. When a half-duplex UE is configured for transmission in symbols of a FD slot, another UE can be configured for reception in the symbols of the FD slot. A FD UE can transmit and receive simultaneously in symbols of a FD slot, possibly in presence of other UEs with resources for either receptions or transmissions in the symbols of the FD slot. Transmissions by a UE in a first FD slot can use same or different frequency-domain resources than in a second FD slot, wherein the resources can differ in bandwidth, a first RB, or a location of the center carrier.

When a UE receives signals/channels from a gNB in a full-duplex slot, the receptions may be scheduled in a DL subband of the full-duplex slot. When full-duplex operation at the gNB 102 uses DL slots for scheduling transmissions from the UE 116 using full-duplex transmission and reception at the gNB 102, there may be one or multiple, such as two, DL subbands in the full-duplex slot. When a UE is scheduled to transmit in a full-duplex slot, the transmission may be scheduled in an UL subband of the full-duplex slot. When full-duplex operation at the gNB 102 uses UL slots for purpose of scheduling transmissions to UEs using full-duplex transmission and reception at the gNB 102, there may be one or multiple, such as two, UL subbands in the full-duplex slot.

For a carrier aggregation TDD configuration with FD enabled, a UE receives in a slot on CC #1 and transmits in at least one or more symbols of the slot on CC #2. In addition to D slots used only for transmissions/receptions by a gNB/UE, U slots used only for receptions/transmissions by the gNB 102/UE 116, and S slots that are used for both transmission and receptions by the gNB 102/UE 116 and also support DL-UL switching, FD slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for FD operation. Transmissions from a UE can also occur in a last slot (U) where the full UL transmission bandwidth is available. FD slots or symbol assignments over a time period/number of slots can be indicated by a DCI format in a PDCCH reception and can then vary per unit of the time period, or can be indicated by higher layer signaling, such as via a MAC CE or RRC.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-Configuration-Dedicated as example for UE-specific configuration. The UE determines a common TDD UL-DL frame configuration of a serving cell by receiving a SIB such as a SIB1 when accessing the cell from RRC_IDLE or by RRC signaling when the UE is configured with an SCell or additional SCGs by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity of description, SFI refers to a slot format indicator as example that is indicated using higher layer provided IEs such as slotFormatCombination or slotFormatCombinationsPerCell and which is indicated to the UE by group common DCI format such as DCI F2_0 where slotFormats are defined in REF3.

In the following, for brevity of description, the term 'fd-config' is used to describe the configuration and parameterization for UE determination of receptions and/or transmissions in a serving cell supporting full-duplex operation. For example, the UE may be provided with the set of RBs or set of symbols of an SBFD UL or DL subband. It is not necessary that the use of full-duplex operation by a gNB in the serving cell when scheduling to a UE receptions and/or transmissions in a slot or symbol is identifiable by or known to the UE. For example, parameters associated with the parameter 'fd-config' may include a set of time-domain resources, e.g., symbols/slots, where receptions or transmissions by the UE are allowed, possible, or disallowed; a range or a set of frequency-domain resources, e.g., serving cells, BWPs, start and/or end or a set of RBs, where receptions or transmissions by the UE are allowed, possible, or disallowed; one or multiple guard intervals for time and/or frequency domain radio resources during receptions or transmissions by the UE, e.g., guard SCs or RBs, guard symbols; one or multiple resource types, e.g., 'simultaneous Tx-Rx', 'Rx only', or 'Tx only' or 'D', 'U', 'F', 'N/A'; one or multiple scheduling behaviors, e.g., "DG only", "CG only", "any". Configuration and/or parameters associated with the fd-config may include indications or values to determine Tx power settings of receptions by the UE, such as, reference power, energy per resource element (EPRE), or power offset of a designated channel/or signal type transmitted by a serving gNB; to determine the power and/or spatial settings for transmissions by the UE. Configuration and/or parameters associated with the fd-config may be provided to the UE using higher layer signaling, DCI-based signaling, and/or MAC CE based signaling. For example, configuration and/or parameters associated with fd-config may be provided to the UE by means of common RRC signaling using SIB or by UE-dedicated RRC signaling such as ServingCellConfig. For example, configuration and/or parameters associated with fd-config may be provided to the UE using an RRC-configured TDRA table, or a PDCCH, PDSCH, PUCCH or PUSCH configuration, and/or DCI-based signaling that indicates to the UE a configuration for the UE to apply.

Knowledge of available transmission power from a UE is beneficial for a gNB scheduler. For example, based on information for available transmission power from the UE 116, the gNB 102 scheduler can avoid scheduling for a higher UL data rate than the available UE transmission power can support. The available DL transmission power is known to the gNB 102 scheduler because the DL amplifiers are located in the gNB 102 or the radio units connected to it. For the UL, the gNB 102 can control and adjust the UE 116 transmit power, e.g., using open loop power control (OLPC) parameter settings and/or closed loop power control (CLPC) commands. When compared to the configured UE maximum output power, the UE 116 can provide to the gNB 102 the available UE transmission power or a power headroom report (PHR). A UE can provide PHR through a MAC control element (CE) in a PUSCH.

Three types of PHR are supported: PHR Type 1 for PUSCH transmission, PHR Type 2 for simultaneous PUSCH and PUCCH transmission in an LTE Cell Group in EN-DC, and PHR Type 3 for sounding reference signal (SRS) transmission. In case of CA, when no transmission from a UE occurs on an activated SCell, the UE 116 uses a reference power to provide a virtual PHR report. In order for the UE 116 to also provide information to the gNB 102 of a power reduction, the PHR reports may also contain Power Management Maximum Power Reduction (P-MPR) information that the UE 116 uses to ensure compliance with the FR2 Maximum Permissible Exposure (MPE) regulations that are set for limiting RF exposure on human body.

For carrier aggregation (CA) or dual connectivity (DC), NR supports that multiple PHRs can be contained in a single MAC-CE. Unlike UL power control that can operate different power control processes for different beam-pair links, a PHR is per carrier and does not explicitly evaluate beam-based operation. One reason is that the gNB 102 may control the DL/UL beams used for transmissions/receptions and may determine the gNB-UE beam arrangement corresponding to a certain PHR.

A gNB can configure power headroom reporting from a UE to occur periodically, for example as controlled by a timer. It is possible to configure a prohibit timer to control a minimum time between two PHRs in order to reduce the UL signaling load. A PHR can also be triggered by a UE due to a change in path loss based on measurements by the UE 116, e.g., when a difference between a current PHR or path loss and a previous PHR or path loss is larger than a configurable threshold. When a UE is provided parameter mpe-Reporting-FR2, the UE 116 provides a PHR, for example, when the measured P-MPR that the UE 116 applies to meet FR2 MPE requirements is equal to or larger than a value of parameter mpe-Threshold for at least one activated FR2 serving cell since the UE 116 provided a last PHR and when the prohibit timer is not running. A UE can also include a PHR in a PUSCH instead of performing padding.

A single entry PHR MAC CE has a fixed size and includes two octets. A Reserved bit field R is set to 0. A Power Headroom (PH) field indicates the power headroom level. The length of the field is 6 bits. When mpe-Reporting-FR2 is provided and the serving cell operates on FR2, a P field is set to zero if the P-MPR value applied by the UE 116 to meet MPE requirements is less than P-MPR_00 as described in REF9 and to 1 otherwise. If the UE 116 is not provided mpe-Reporting-FR2 or when the serving cell operates on FR1, the P field indicates whether the UE 116 applies power backoff due to power management. The UE 116 sets the P field to 1 if the corresponding PCMAX,f,c field would have had a different value if the UE 116 had not applied power backoff due to power management. A PCMAX,f,c field indicates the PCMAX,f,c as defined in REF3 used for calculation of the preceding PH field. The reported PCMAX,f,c and the corresponding nominal UE transmit power levels are defined in REF5. If the UE 116 is provided mpe-Reporting-FR2 and the serving cell operates on FR2 and the P field is set to 1, a MPE field indicates the applied power backoff to meet MPE requirements. The length of the field is 2 bits. If mpe-Reporting-FR2 is not provided, or if the serving cell operates on FR1, or if the P field is set to 0, R bits are present instead.

A multiple entry PHR MAC CE has a variable size and includes a bitmap, a Type 2 PH field, and an octet containing the associated PCMAX,f,c field if reported for SpCell of the other MAC entity, a Type 1 PH field and an octet containing the associated PCMAX,f,c field if reported for the PCell. The multiple entry PHR MAC CE further includes, in ascending order of ServCellIndex, one or multiple of Type X PH fields and octets containing the associated PCMAX,f,c fields if reported for serving cells other than PCell indicated in the bitmap. X is either 1 or 3. Further details are provided in REF3.

PHR Type 1 provides the power headroom assuming PUSCH-only transmission on the serving cell, e.g., PHR Type 1 is valid for a certain component carrier assuming that the UE 116 was scheduled a PUSCH transmission during a certain duration. The UE 116 includes the PHR and the corresponding value of configured UE maximum output power, PCMAX, in the PHR MAC CE. The value of PCMAX is configured by the gNB 102 and therefore is in principle known to the gNB 102. A reason for the UE 116 to include the value of PCMAX in the PHR is that ambiguity can exist in some cases. For example, a separate value for PCMAX can be configured for a normal UL carrier (NUL) and a supplementary UL carrier (SUL). Even if both carriers belong to the same cell, e.g., are both associated with the same DL carrier, the gNB 102 needs to know for which UL carrier the UE 116 provides the PHR. Power headroom is a measure of the difference between PCMAX and the UE 116 transmit power that the UE 116 would have used assuming no upper limit on the transmit power. Power headroom can therefore also be a negative value, indicating that the UE 116 transmit power on the carrier was limited by PCMAX at the time of the PHR computation by the UE 116. For example, a negative PHR value may result when the gNB 102 has scheduled a higher data rate than the UE 116 could support for the available transmission power. The gNB 102 knows the MCS and resource allocation used for a PUSCH transmission by the UE 116 in the time duration corresponding to the PHR. The gNB 102 can determine appropriate combinations of MCS and resource allocation assuming that the DL path loss observed by the UE 116 remains constant. PHR Type-1 can also be reported when there is no actual PUSCH transmission using an assumed or virtual reference transmission format for a PUSCH.

A PHR Type 2 is similar to PHR Type 1 but assumes simultaneous PUSCH and PUCCH transmission. PHR Type 3 indicates power headroom for SRS transmissions. For example, a PHR Type 3 may allow a gNB to evaluate the UL quality of candidate UL carriers that are sounded by the UE 116 through SRS transmissions. If a candidate carrier is deemed favorable by the gNB 102, the gNB 102 can re-configure the UE 116 for transmissions on the candidate UL carrier.

A UE determines whether a PHR for an activated serving cell is based on an actual transmission or a reference format. This determination is based on higher layer signaling of configured grant and periodic/semi-persistent SRS transmissions and DCI formats that the UE 116 received until and including the PDCCH monitoring occasion where, if the PHR is reported on a PUSCH triggered by the first DCI format, the UE 116 detects the first DCI format scheduling an initial transmission of a transport block (TB) since a PHR was triggered.

Otherwise, the UE 116 determines whether a PHR is based on an actual transmission or a reference format based on higher layer signaling of configured grant and periodic/semi-persistent SRS transmissions and DCI formats the UE 116 received until the first UL symbol of a configured PUSCH transmission minus $T'_{proc,2}-T_{proc,2}$ where $T_{proc,2}$ is determined according to REF4 assuming $d_{2,1}=1$, $d_{2,2}=0$, and with $\mu_{DL}$ corresponding to the subcarrier spacing of the active DL BWP of the scheduling cell for a configured grant if the power headroom report is reported on the PUSCH using the configured grant.

If the UE 116 determines that a PHR Type 1 for an activated serving cell is based on a reference PUSCH transmission then, for PUSCH transmission occasion i on active UL BWP b of carrier f of serving cell c, the UE 116 computes the PHR Type 1 as $$PH_{type1,b,f,c}(i, j, q_d, l) = \tilde{P}_{CMAX,f,c}(i) - \{P_{O\_PUSCHb,f,c}(j) + \alpha_{b,f,c}(j)\cdot PL_{b,f,c}(q_d) + f_{b,f,c}(i, l)\}\ [\text{dB}]$$

where $\tilde{P}_{CMAX,f,c}(i)$ is computed assuming MPR-0 dB, A-MPR=0 dB, P-MPR=0 dB. $\Delta T_C$=0 dB. MPR, A-MPR, P-MPR and $\Delta T_C$ and remaining parameters are defined in REF8, REF9, REF10, and REF3. If ul-powerControl is not provided, $P_{O\_PUSCH,b,f,c}(j)$ and $\alpha_{b,f,c}(j)$ are obtained using $P_{O\_NOMINAL,PUSCH,f,c}(0)$ and p0-PUSCH-AlphaSetId=0, $PL_{b,f,c}(q)$ is obtained using pusch-PathlossReferenceRS-Id=0, and l=0. Further details are described in REF3.

When evaluating power headroom reporting in a full-duplex wireless communication system, several issues of existing state-of-the-art technology need to be overcome.

It should be regarded that a power for PUSCH, PUCCH, SRS or physical random access channel (PRACH) transmissions in normal UL (or non-SBFD) slot(s)/symbol(s) and the full-duplex (or SBFD) slot(s)/symbol(s) may need to be controlled separately. Separate UL power control may also be necessary for different SBFD slot(s)/symbol(s). Adjustment and control by the gNB for the power of a PUSCH, PUCCH, SRS or PRACH transmission by a UE on a slot/symbol is based on appropriate parameterization of the allowed or configured UE maximum output power, open-loop power control (OLPC) parameter sets including target received power and fractional pathloss compensation coefficient and closed-loop power control (CLPC) processes. For brevity, the disclosure evaluates PUSCH transmissions and same principles can apply for PUCCH or SRS transmissions on non-SBFD slots/symbols versus on SBFD slots/symbols.

A gNB receiver in a full-duplex or SBFD wireless communication system may use a different number of receiver antennas, a different effective receiver antenna aperture area, and/or different receiver antenna directivity settings for receptions in a normal UL slot/symbol, i.e., non-SBFD slot/symbol, when compared to receptions in an UL subband of an SBFD slot/symbol. Note that similar evaluations may apply for gNB transmissions on non-SBFD slots/symbols when compared to the gNB transmissions in DL sub-bands of a SBFD slot/symbol. Therefore, there is a need to adjust the UE transmit power separately for the non-SBFD and for the SBFD slots/symbols.

Furthermore, in order to prevent possible gNB receiver-side AGC blocking and to enable effective implementation of serial interference cancellation (SIC) during receptions in the UL subband of an SBFD slot/symbol, corresponding Rx power target levels for transmissions from a UEs in an UL sub-band of an SBFD slot/symbol may need to be adjusted separately from the Rx power target levels for transmissions from the UE in non-SBFD slots/symbols. Therefore, there is another need to adjust the UE UL transmit power separately for the non-SBFD or SBFD slot(s)/symbol(s).

Furthermore, the transmission power from a UE in an UL subband of an SBFD slot/symbol determines the interference range of an aggressor UE with respect to co-scheduled UEs in the same cell and in adjacent cells. When a same transmit power is used by the UE for the non-SBFD slots/symbols and for the SBFD slots/symbols, corresponding interference ranges of a transmission from the UE in those slots are then also same. For full-duplex or SBFD operation on the serving cell, it is beneficial to limit the interference range of the UE transmitting in an UL sub-band using an SBFD slot/symbol when compared to a transmission using a non-SBFD slot/symbol. The aggressor UE transmitting in the SBFD slot interferes with the victim UE receiving in the DL of the same serving cell and/or adjacent cells. The aggressor UE transmitting in the non-SBFD slot/symbol does not interfere with DL receptions by UEs in the same serving cell and in adjacent cells assuming that a same TDD UL-DL frame configuration is used by the cells in a deployment and assuming that a guard period is sufficiently large. Therefore, there is another need to adjust the UE transmit power separately for non-SBFD slots/symbols and for SBFD slots/symbols.

Using existing technology, the UE may include a PHR value and an associated value for a configured UE maximum output power, PCMAX, in a PHR MAC CE.

A first issue relates to the evaluation and timing of the PHR in a full-duplex wireless communication system. Using existing technology, the gNB cannot control and adjust the evaluation and report timing of the PHR for the UE suitable to the operational characteristics of the full-duplex or SBFD wireless communication system.

Using existing technology, power headroom reporting from the UE is only supported 'per carrier', i.e., for a serving cell. When full-duplex or SBFD operation is enabled on the serving cell, existing technology does not allow to obtain or control a power headroom report from a UE for an actual or for an assumed reference transmission format selectively for the SBFD slot(s)/symbol(s), or for the non-SBFD slot(s)/symbol(s), or to obtain a PHR from the UE for both types of slot(s)/symbol(s). Using existing technology, the evaluation and reporting timings of a PHR from the UE can only be set and controlled by the gNB with respect to a same configured timer value based on periodic power headroom reporting, possibly combined with the use of a prohibit timer. Using existing technology for power headroom reporting in the example full-duplex communication system of FIG. 7 to obtain separate PHRs for a non-SBFD slot and an SBFD slot from a UE, use of the periodic PHR to control the evaluation and reporting timing from the UE on a serving cell would then result in a need for the UE to provide the PHR multiple times per UL-DL frame configuration period. This would result in substantial reporting overhead, additional UE power consumption, and would not be compatible with the use of the PHR prohibit timer. PHR using a periodic timer can currently be configured from 10 subframes to 1000 subframes, or 10 msec to 1 sec. Therefore, there is need for novel methods and procedures enabling to control and adjust the PHR evaluation and reporting timing and enabling selective and concurrent power headroom reporting from a UE in full-duplex or SBFD wireless communication system.

A second issue relates to a need to support selective or concurrent PHRs from a UE for UL channels/signals that may be transmitted by the UE on the non-SBFD and SBFD slot(s)/symbol(s) in a full-duplex wireless communication system.

It should be regarded that an UL sub-band of SBFD slot(s)/symbol(s) in the full-duplex wireless communication system may be allocated to cell edge UEs for purpose of extending UL coverage. Accordingly, repetitions for a PUSCH or PUCCH transmission by the UE may then be configured for SBFD slot(s)/symbol(s). Normal UL or non-SBFD slot(s)/symbol(s) may be allocated to UEs experiencing medium to good signal-to-interference-plus-noise ratio (SINR) conditions. Accordingly, dynamic grant (DG) based PUSCH allocations with high modulation and coding scheme (MCS) and large RB allocation settings may be used.

Using existing technology, single entry or multiple entry PHR MAC CE formats from a UE cannot provide separate PHR values and associated configured UE maximum output power values, PCMAX, for PUSCH or PUCCH transmissions with repetitions using multiple SBFD slots or using both non-SBFD and SBFD slots. Using existing technology, only a single slot instance may be used for the power headroom evaluation by the UE. However, separate adjustment and control by the gNB for the power of a PUSCH or PUCCH transmission by a UE using multiple SBFD slot(s)/symbol(s) or using both SBFD and non-SBFD slot(s)/symbol(s) may be required, including separate settings for the allowed or configured UE maximum output power on the serving cell supporting SBFD. For example, a PHR value for one slot may not be representative of a PHR value in another slot of a PUSCH or PUCCH transmission with repetitions because the configured UE maximum output power values may be different for SBFD slots and for non-SBFD slots on the serving cell.

Note that similar issues arise from a need to configure transmissions of various channels/signals in non-SBFD and SBFD slot(s)/symbol(s), respectively. For example, allocations on SBFD slot(s)/symbol(s) for compressed gated (CG)-PUSCH transmissions may need to be supported for improved UL coverage for a UE, but dynamic grant based PUSCH allocations may be used in non-SBFD slot(s)/symbol(s) for the UE. Using existing technology, a same PUSCH transmission format must be used by the UE per power headroom reporting instance which is not sufficient in the context of full-duplex system operation.

A third issue relates to virtual PHR in a full-duplex wireless communication system.

Using existing technology, a UE needs to use a same set of assumed reference PUSCH transmission parameters to compute $\tilde{P}_{CMAX,f,c}(i)$ in the non-SBFD slot(s)/symbol(s) and in the SBFD slot(s)/symbols. However, the UE may use different UE Tx baseband filtering and corresponding power adjustments for transmissions in an UL sub-band of SBFD slot(s)/symbol(s) when compared to transmissions in non-SBFD slot(s)/symbol(s). A consequence may be inaccurate, such as pessimistic, PHR values that may impact the gNB scheduling for the UE and may reduce UL throughput and spectral efficiency.

A fourth issue is event-triggered PHR from a UE, e.g., due to change in pathloss or due to P-MPR to meet the FR2 MPE requirements in a full-duplex wireless communication system.

Using existing technology, a single type of event-triggered PHR from the UE may be configured. No distinction between PHR triggering events occurring in non-SBFD slot(s)/symbol(s) and the SBFD slot(s)/symbol(s), respectively, is possible. For example, an ability to support event-triggered PHR separately for the non-SBFD/SBFD slot(s)/symbol(s) is of particular importance with respect to FR2 MPE requirements when mpe-Reporting-FR2 is configured for the UE. Meeting MPE requirements is a regulatory requirement. P-MPR(s) directly relate to the UE time slot utilization ratio, i.e., the number of slots during a period that can be used for transmissions by the UE. If a conservative number of slots is determined by the gNB as not being schedulable for the UE based on a conservative PHR value from the UE, the UE UL peak throughput may then be correspondingly reduced.

Therefore, there is need for novel methods and enhanced procedures enabling to indicate, control, and adjust the UE power headroom reporting in a full-duplex or SBFD wireless communication system.

The disclosure evaluates methods where a UE is provided higher layers information to selectively enable or disable PHR for non-SBFD/SBFD slots/symbols, multiple reporting or prohibit timer values for PHR reporting on selected non-SBFD/SBFD slots/symbols, and multiple parameter sets for PHR evaluation of reference PUSCH transmission. The disclosure evaluates methods where a UE determines or selects a PHR format for an actual PUSCH transmission or a transmission based on a reference PUSCH format in a slot/symbol based on a slot/symbol type.

Various embodiments of the present disclosure include but are not limited to:

- PHR selectively enabled/disabled for non-SBFD/SBFD slots/symbols or configured/restricted for (un-)intended time-domain resources;
- Separate periodic reporting/prohibit timer values for PHR on non-SBFD/SBFD slots/symbols;
- Separate parameter sets for reference PUSCH format(s) on non-SBFD/SBFD slots/symbols; and
- PHR format on slot/symbol for actual or reference PUSCH determined by UE based on slot type.

In one embodiment, a UE is provided by higher layers information to selectively enable or disable PHR for an actual PUSCH transmission, or for a transmission based on a reference PUSCH format, based on a slot or symbol type or based on an SBFD subband type. The UE 116 may determine a slot or symbol type or an SBFD subband type according to the exemplary procedures described in other embodiments of the disclosure.

For example, a UE is provided information that PHR of an actual or a reference PUSCH transmission is disabled for SBFD slot(s)/symbol(s), but enabled for non-SBFD slot(s)/symbol(s). In another example, a UE is provided information that PHR of an actual or a reference PUSCH transmission is disabled for SBFD transmissions in slot(s)/symbol(s) of type 'F', but enabled for SBFD transmissions in slot(s)/symbol(s) of type 'D' and enabled for non-SBFD slot(s)/symbol(s). In another example, a UE is provided information that PHR of an actual or a reference PUSCH transmission is enabled only for the SBFD slot(s)/symbol(s). For example, the information to selectively enable or disable PHR may be associated with a set of possible settings {'any', 'non-SBFD only, 'SBFD only'}. In another example, a UE is provided information that PHR of an actual or a reference PUSCH transmission is selectively enabled or not enabled with respect to an SBFD subband type. For example, the information to selectively enable or disable PHR may be associated with a set of possible settings {'any subband', 'SBFD UL subband only, 'SBFD flexible subband'}

For example, a PHR from the UE 116 is triggered when any of the following events occur: phr-ProhibitTimer expires or has expired and the path loss has changed more than phr-Tx-PowerFactorChange dB for at least one activated Serving Cell; phr-PeriodicTimer expires; upon configuration or reconfiguration of the power headroom reporting functionality by upper layers, which is not used to disable the function; phr-ProhibitTimer expires or has expired, when the MAC entity has UL resources for new transmission; and power headroom reporting on the UL resource is enabled by higher layers.

A motivation for the above UE behavior is reduced implementation complexity. By selectively enabling or disabling power headroom reporting based on a slot/symbol type such as 'non-SBFD' versus 'SBFD' or 'SBFD using DL slot/symbol' or 'SBFD using F slot/symbol', a gNB may restrict power headroom reporting from a UE to a subset of time-domain resources. A PHR from the UE 116 will then be reflective of a transmit power in the restricted slot/or symbol type. If a PHR for another slot/type is desired, the gNB 102 can re-configure power headroom reporting to another set of slots/symbols, e.g., from SBFD slots/symbols to non-SBFD slot(s)/symbol(s). Accordingly, the gNB 102 can select and provide separate power control parameters and settings to the UE 116 which are adapted to the CLI conditions and the gNB 102 SIC implementation constraints to adjust or control the power of PUSCH transmissions by the UE 116 on the full-duplex or SBFD slot/symbol.

In one embodiment, the UE 116 is provided a slot/symbol index or a set of slot(s)/symbol(s) or an SBFD subband type or a set of SBFD subband types where the UE 116 may determine a PHR value for an actual PUSCH transmission or for a transmission based on a reference PUSCH format. Alternatively, the UE 116 is provided with time-domain resources, e.g., slot(s)/symbol(s) where PHR is not allowed and the UE 116 shall not evaluate power headroom for an actual or reference PUSCH transmission even when the MAC entity has UL resources for new transmission and there are UL resources allocated for transmission on the indicated slots/symbols.

For example, the UE 116 is provided by higher layers a subset of slot(s)/symbol(s) in the set of slot(s)/symbol(s) of a DL-UL frame configuration of a period p for power headroom reporting. For example, the UE 116 may be provided a list or sequence or bitmap representative of M slot(s)/symbol(s) from the set of N slot(s)/symbol(s) in a period p. A UE may determine a subset of M slot(s)/symbol(s) from the set of N slot(s)/symbol(s). For example, the UE 116 may determine the first or the last M slot(s)/symbol(s) from a set of N slot(s)/symbol(s) as a subset. For example, M may be 1 or M may be associated with default value(s). Multiple subsets of slot(s)/symbol(s) may be provided to the UE 116 or be determined by the UE 116.

For example, with reference to FIG. 7, a gNB may configure a UE, using higher layer parameter phr-Restriction, to provide PHR using a set of slot/symbol indices for the $2^{nd}$ and $3^{rd}$ slot where SBFD operation is supported. For example, phr-Restriction may be a bitmap '01100' with an entry for every slot in the UL-DL frame configuration of period p.

A PHR from the UE 116 is then triggered when any of the following events occur: phr-ProhibitTimer expires or has expired and the path loss has changed more than phr-Tx-PowerFactorChange dB for at least one activated Serving Cell; phr-PeriodicTimer expires; upon configuration or reconfiguration of the power headroom reporting functionality by upper layers, which is not used to disable the function; phr-ProhibitTimer expires or has expired, when the MAC entity has UL resources for new transmission; and when the UL transmission is scheduled or configured in a slot indicated as enabled by phr-Restriction.

If a UE determines that a Type 1 PHR for an activated serving cell is based on an actual PUSCH transmission then, for PUSCH transmission occasion i when indicated as enabled by phr-Restriction on active UL BWP b of carrier f of serving cell c, the UE 116 computes the Type 1 power headroom report as, $$PH_{type1,b,f,c}(i, j, q_d, l) = P_{CMAX,f,c}(i) - \{P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l)\} \text{ [dB]}$$

where $P_{CMAX,f,c}(i)$, $P_{O\_PUSCH,b,f,c}(j)$, $$P_{CMAX,f,c}(i),\ P_{O\_PUSCH,b,f,c}(j),\ M_{RB,b,f,c}^{PUSCH}(i),$$
$$\alpha_{b,f,c}(j),\ PL_{b,f,c}(q_d),\ \Delta_{TF,b,f,c}(i) \text{ and } f_{b,f,c}(i,l)$$

$\alpha_{b,f,c}(j)$, $PL_{b,f,c}(q_d)$, $\Delta_{TF,b,f,c}(i)$ and $f_{b,f,c}(i, l)$ are defined in REF3. A similar principle can be applied for a PHR corresponding to a PUSCH reference format. If the UE 116 determines that a PHR Type 1 for an activated serving cell is based on a reference PUSCH transmission then, for PUSCH transmission occasion i when indicated as enabled by phr-Restriction on active UL BWP b of carrier f of serving cell c, the UE 116 computes the PHR Type 1.

Figure 8:
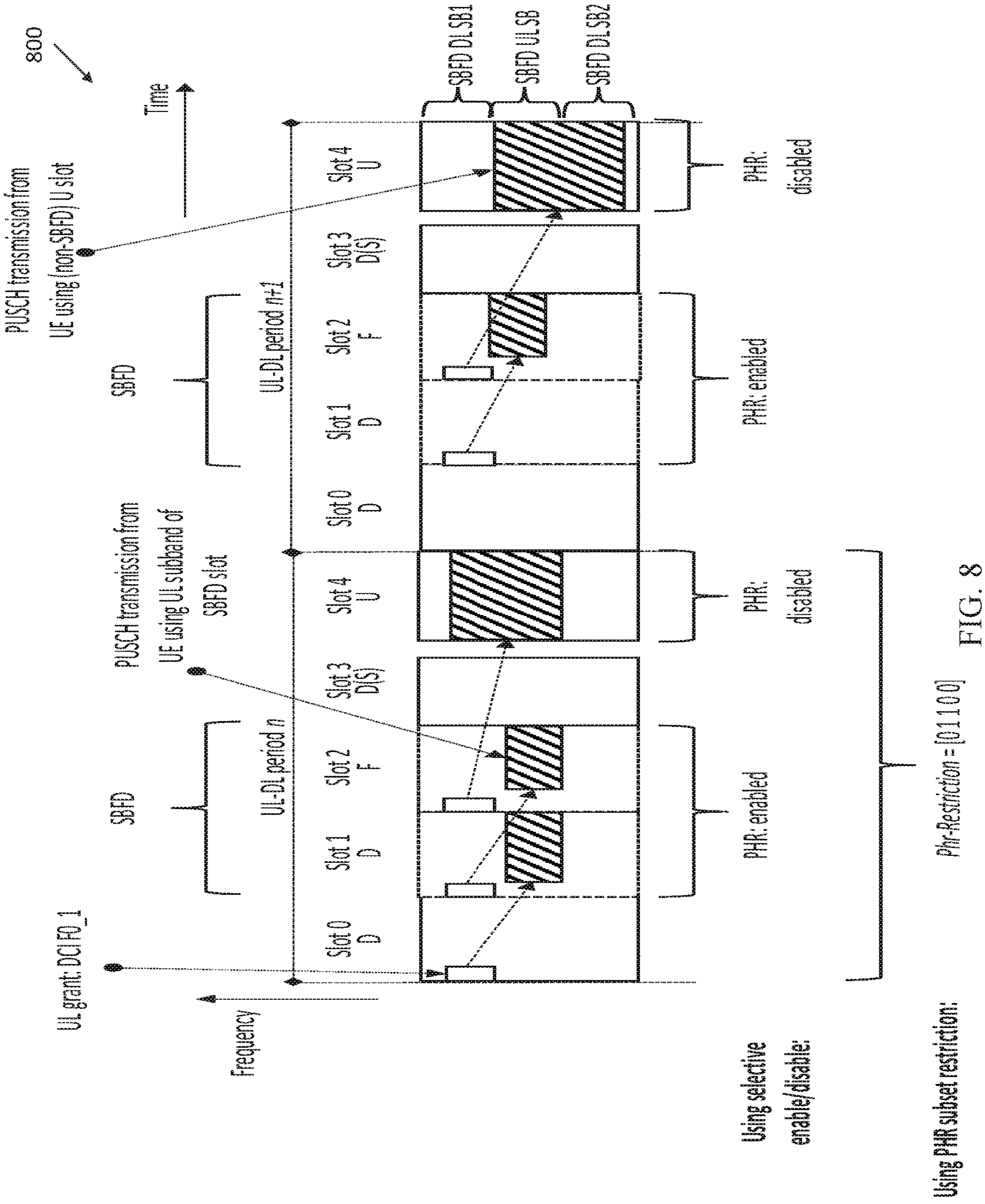
FIG. 8 illustrates a timeline for non-sub-band full duplex (SBFD)/SBFD slots/symbols according to embodiments of the present disclosure.

FIG. 8 illustrates a timeline 800 for non-SBFD/SBFD slots/symbols according to embodiments of the present disclosure. For example, timeline 800 for non-SBFD/SBFD slots/symbols can be scheduled by the BS 102 of FIG. 1. This example is for illustration only and other embodiments can be used without departing from the scope of the present disclosure.

A motivation for the UE 116 behavior described herein is that the gNB 102 may selectively restrict power headroom reporting from a UE to a subset of time-domain resources. Then, a PHR provided by the UE 116 will be reflective of a transmit power in the restricted slot/or symbol type. To obtain a PHR for another slot/type, the gNB 102 can re-configure power headroom reporting to another set of slots/symbols, e.g., from SBFD slots/symbols to non-SBFD slot(s)/symbol(s). Accordingly, the gNB 102 can select and provide separate power control parameters and settings to the UE 116 which are adapted to the CLI conditions and the gNB 102 SIC implementation constraints to adjust or control the transmit power of PUSCH transmissions on the full-duplex or SBFD slot/symbol. Similar considerations can be applied to the case where PHR reporting is selectively adjusted, controlled or parametrized with respect to an SBFD subband type.

Figure 9:
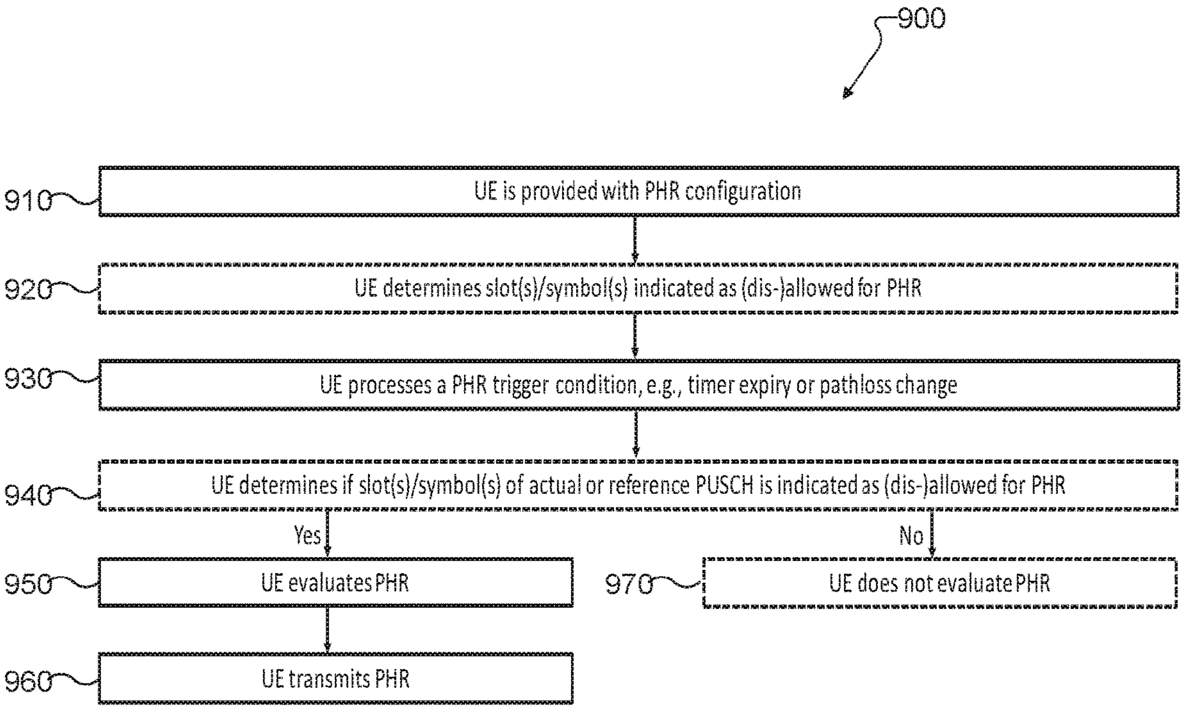
FIG. 9 illustrates a flowchart of an example UE procedure for non-SBFD/SBFD slots/symbols according to embodiments of the present disclosure.

FIG. 9 illustrates a flowchart of an example UE procedure 900 for non-SBFD/SBFD slots/symbols according to embodiments of the present disclosure. For example, procedure 900 for non-SBFD/SBFD slots/symbols can be performed by any of the UEs 111-116 of FIG. 1. This example is for illustration only and other embodiments can be used without departing from the scope of the present disclosure.

The procedure begins in 910, a UE is provided with PHR configuration. In 920, the UE 116 determines slot(s)/symbol(s) indicated as (dis-)allowed for PHR. In 930, the UE 116 processes a PHR trigger condition, e.g., timer expiry or pathloss change. In 940, the UE 116 determines if slot(s)/symbol(s) of actual or reference PUSCH is indicated as (dis-)allowed for PHR. When the UE 116 does determine slot(s)/symbol(s) of actual or reference PUSCH are indicated as (dis-) allowed for PHR, in 950, the UE 116 evaluates PHR. In 960, the UE 116 transmits PHR. Alternatively when the UE 116 does not determine slot(s)/symbol(s) of actual or reference PUSCH are indicated as (dis-)allowed for PHR, in 970, the UE 116 does not evaluate PH.

Figure 10:
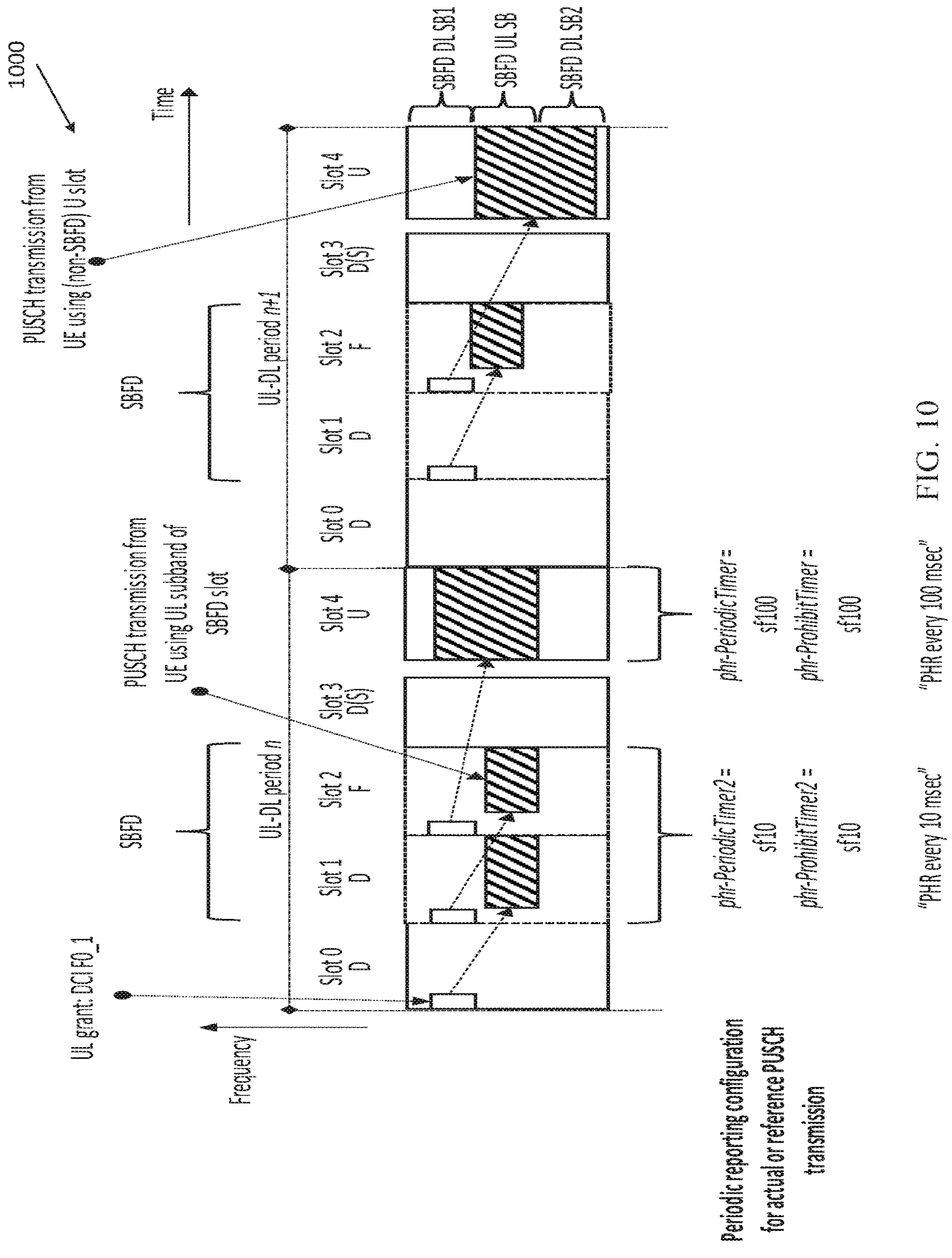
FIG. 10 illustrates a timeline for PHR reporting on selected non-SBFD/SBFD slots/symbols according to embodiments of the present disclosure.

FIG. 10 illustrates a timeline 1000 for PHR reporting on selected non-SBFD/SBFD slots/symbols according to embodiments of the present disclosure. For example, timeline 1000 for PHR reporting on selected non-SBFD/SBFD slots/symbols can be scheduled by the BS 102 of FIG. 1. This example is for illustration only and other embodiments can be used without departing from the scope of the present disclosure.

Figure 11:
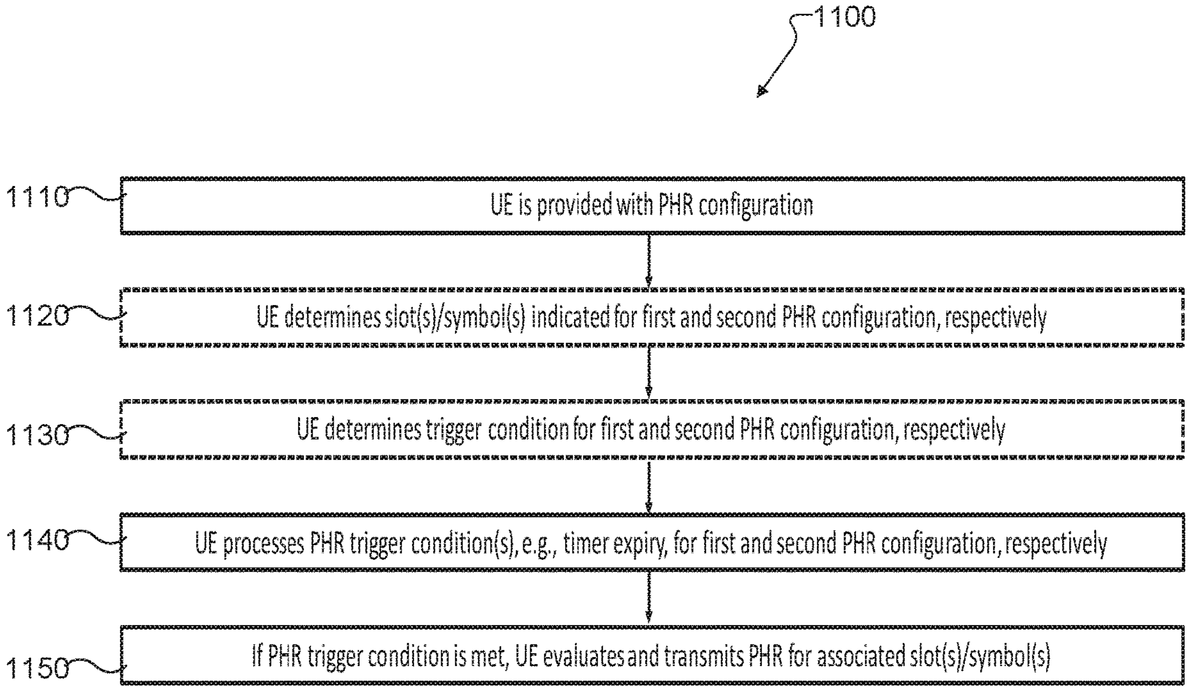
FIG. 11 illustrates a flowchart of an example UE procedure for PHR reporting on selected non-SBFD/SBFD slots/symbols according to embodiments of the present disclosure.

FIG. 11 illustrates a flowchart of an example UE procedure 1100 for PHR reporting on selected non-SBFD/SBFD slots/symbols according to embodiments of the present disclosure. For example, procedure 1100 for PHR reporting on selected non-SBFD/SBFD slots/symbols can be performed by the UE 116 of FIG. 3. This example is for illustration only and other embodiments can be used without departing from the scope of the present disclosure.

The procedure begins in 1110, a UE is provided with PHR configuration. In 1120, the UE 116 determines slot(s)/symbol(s) indicated for first and second PHR configurations, respectively. In 1130, the UE 116 determines trigger condition for first and second PHR configurations, respectively. In 1140, the UE 116 processes PHR trigger condition(s), e.g., timer expiry for first and second PHR configuration, respectively. In 1150, if the PHR trigger is met, the UE 116 evaluates and transmits PHR for associated slot(s)/symbol(s).

In one embodiment, a UE is provided with multiple timer values for periodic power headroom reporting, or a UE is provided with multiple PHR prohibit timer values associated with power headroom reporting.

For example, a UE is provided a first PHR timer value, phr-PeriodicTimer, associated with a first PHR reporting period, and a second PHR timer value, phr-PeriodicTimer2, associated with a second PHR reporting period. For example, a UE is provided a first PHR prohibit timer value phr-ProhibitTimer associated with a first PHR and a second PHR prohibit timer value phr-ProhibitTimer2 associated with a second PHR.

For example, the UE 116 is provided a first PHR timer value, phr-PeriodicTimer, for power headroom reporting for an actual or a reference PUSCH transmission on non-SFBD slots or symbols and a second PHR timer value, phr-PeriodicTimer2, for power headroom reporting for an actual or a reference PUSCH transmission on SFBD slots or symbols. When phr-PeriodicTimer expires, a PHR from the UE 116 is triggered for the non-SBFD slots/symbols. When phr-PeriodicTimer2 expires, a PHR from the UE 116 is triggered for the SBFD slots/symbols. The principles extend to the case where separate periodic timer values are used for power headroom reporting for separate sets of SBFD slot(s)/symbol(s).

For example, the UE 116 is provided a first PHR prohibit timer value, phr-ProhibitTimer, associated with power headroom reporting for an actual or a reference PUSCH transmission on non-SFBD slots or symbols and a second PHR prohibit timer value, phr-ProhibitTimer2, associated with power headroom reporting for an actual or a reference PUSCH transmission on SFBD slots or symbols. A PHR from the UE 116 is triggered for the non-SBFD slots/symbols when phr-ProhibitTimer expires or has expired, when the MAC entity has UL resources for new transmission, and there are UL resources allocated for transmission on the non-SBFD slots/symbols. A PHR from the UE 116 is triggered for the SBFD slots/symbols when phr-ProhibitTimer2 expires or has expired, when the MAC entity has UL resources for new transmission, and there are UL resources allocated for transmission on the SBFD slots/symbols. The principles extend to the case where separate prohibit timer values associated with power headroom reporting are used for separate sets of SBFD slot(s)/symbol(s).

Separate timer values for periodic power headroom reporting or for PHR prohibit timer values associated with power headroom reporting for the non-SBFD/SBFD transmission resources on a serving cell may be used for PHRs from a UE for concurrent PHR MAC CEs or aggregated PHR MAC CEs. Using concurrent PHR MAC CEs, a UE provides separately PHRs for a PUSCH transmission on non-SBFD resource and for PUSCH transmission on SBFD resource of a serving cell. Using aggregated PHR MAC CEs, the PHR values and any associated PCMAX,f,c or MPE field(s) for a non-SBFD and SBFD slot, respectively, are included in one single MAC CE.

It is one advantage of the solution that distinct values for periodic power headroom reporting and associated prohibit timer values can be configured for the non-SBFD and SBFD slots(s)/symbol(s), respectively. For example, a gNB can configure a PHR corresponding a normal UL (or, non-SBFD) slot using 'sf100' (i.e., every 100 subframes) because UL interference is controlled between gNBs. PHR for an UL subband of SBFD slot(s) can be configured using a different value 'sf10' (i.e., every 10 subframes) to enable faster gNB adjustments of UE transmit power control parameters in presence of UE-to-UE CLI. Similar principles extend to the use of separate prohibit timers.

Figure 12:
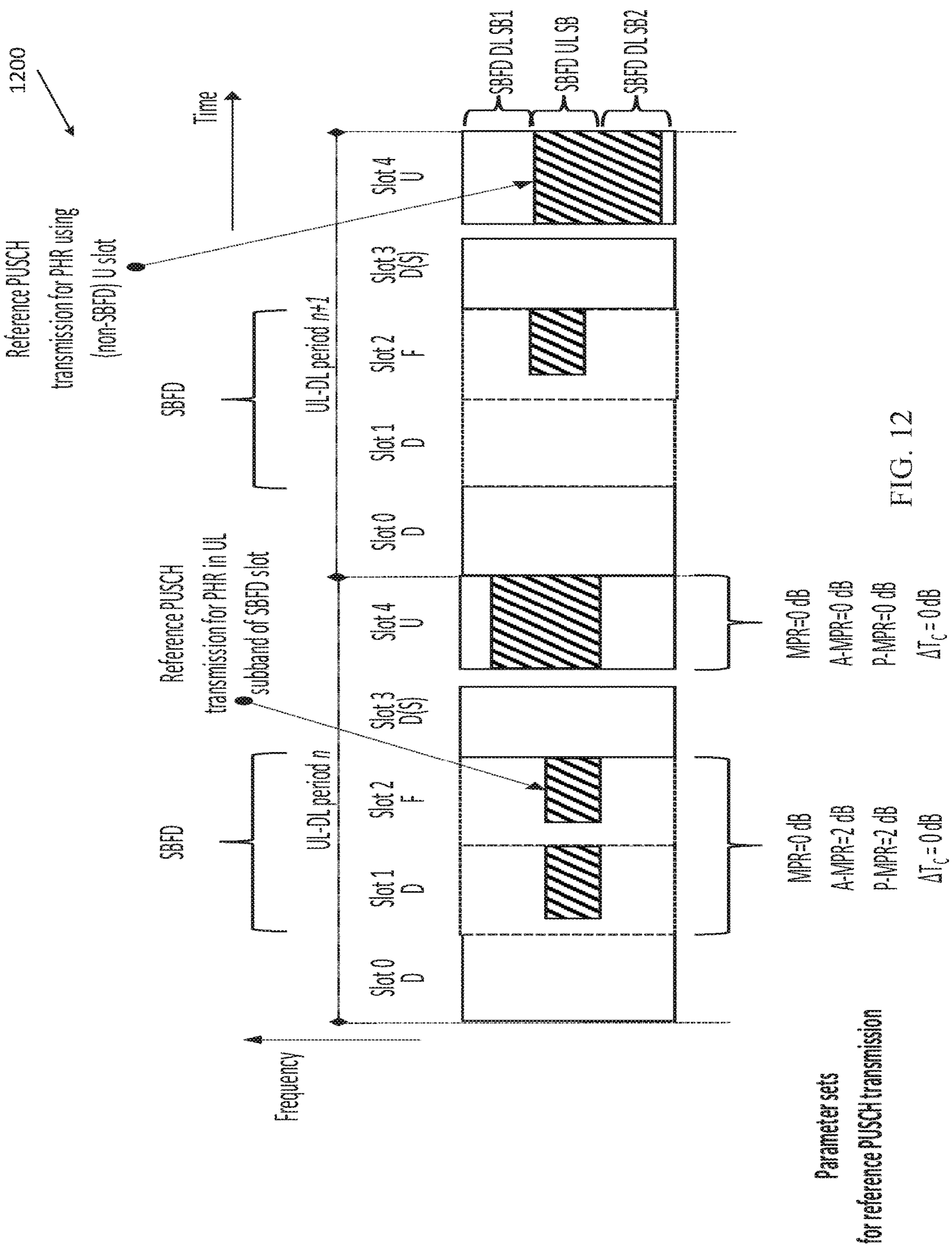
FIG. 12 illustrates a timeline for PHR evaluation of reference physical uplink shared channel (PUSCH) transmission according to embodiments of the present disclosure.

FIG. 12 illustrates a timeline 1200 for PHR evaluation of reference PUSCH transmission according to embodiments of the present disclosure. For example, timeline 1200 for PHR evaluation of reference PUSCH transmission can be scheduled by the BS 103 of FIG. 1. This example is for illustration only and other embodiments can be used without departing from the scope of the present disclosure.

Figure 13:
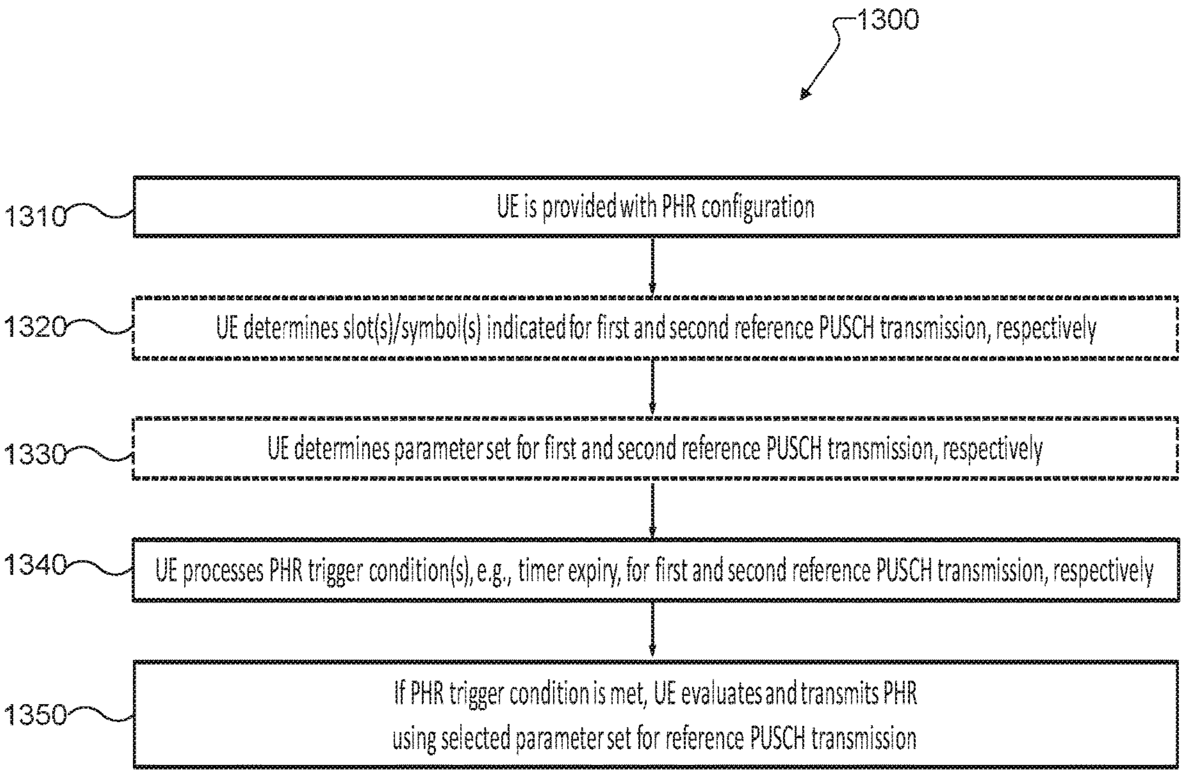
FIG. 13 illustrates a flowchart of an example UE procedure for PHR evaluation of reference PUSCH transmission according to embodiments of the present disclosure.

FIG. 13 illustrates a flowchart of an example UE procedure 1300 for PHR evaluation of reference PUSCH transmission according to embodiments of the present disclosure. For example, procedure 1300 for PHR evaluation of reference PUSCH transmission can be performed by the UE 116 of FIG. 3. This example is for illustration only and other embodiments can be used without departing from the scope of the present disclosure.

The procedure begins in 1310, a UE is provided with PHR configuration. In 1320, the UE 116 determines slot(s)/symbol(s) indicated for first and second reference PUSCH transmissions, respectively. In 1330, the UE 116 determines a parameter set for first and second transmissions, respectively. In 1340, the UE 116 processes PHR trigger condition(s), e.g., timer expiry for first and second reference PUSCH transmissions, respectively. In 1350, if PHR trigger condition is met, the UE 116 evaluates and transmits PHR using selected parameter set for reference PUSCH transmission.

In one embodiment, a UE is provided multiple parameter sets and selects a parameter set to determine a PHR for an activated cell based on a reference PUSCH transmission in a slot/symbol or based on an SBFD subband type.

For example, a parameter set to determine a PHR for a reference PUSCH transmission may include one or more or a combination of an MPR value, an A-MPR value, a P-MPR value, a parameter $\Delta T_C$, a parameter associated with a transmit power value, a parameter associated with a transmit power reduction value, an OLPC parameter set $\{P_0(i), \alpha(i)\}$, a target receive power level $P_0(i)$, a fractional pathloss compensation coefficient $\alpha(i)$, or a pathloss reference signal. A parameter set to determine PHR for a reference PUSCH transmission may be indicated to the UE 116 or may be tabulated/specified in system specifications. Multiple parameter sets to determine PHR for reference PUSCH transmissions may be indicated to the UE 116 or tabulated/specified in system specifications.

The UE 116 selects a first parameter set to determine a PHR $PHR_1$ for a reference PUSCH transmission or a second parameter set to determine a PHR $PHR_2$ for a reference PUSCH transmission on a serving cell on non-SBFD slots/symbols and SBFD slots/symbols, respectively. The first parameter set to determine PHR $PHR_1$ for a reference PUSCH transmission on a serving cell is associated with a first set of slots of the serving cell operating SBFD. The second parameter set to determine PHR $PHR_2$ for a reference PUSCH transmission on a serving cell is associated with a second set of slots on the serving cell not operating SBFD. A parameter set to determine a PHR may be used by the UE 116 to report power headroom for a reference PUSCH transmission(s) in one or multiple slots.

For example, a first parameter set {MPR=0 dB, A-MPR=0 dB, P-MPR-0 dB, $\Delta T_C$=0 dB} to determine PHR for a reference PUSCH transmission in a slot/symbol may be used by the UE 116 on non-SFBD slots or symbols and a second parameter set {MPR-0 dB, A-MPR=2 dB, P-MPR=2 dB, $\Delta T_C$=0 dB} to determine PHR for a reference PUSCH transmission in a slot/symbol may be used by the UE 116 on SFBD slots or symbols. Parameter sets may be tabulated/specified in system specifications, or a parameter set to determine PHR for a reference PUSCH transmission may be provided by the gNB 102 to the UE 116 using higher layer signaling. The UE 116 may determine a parameter set from a default configuration to determine PHR for a reference PUSCH transmission when a parameter set is not provided, e.g., a UE may assume a parameter set {MPR=0 dB, A-MPR-0 dB, P-MPR=0 dB, $\Delta T_C$=0 dB} for a slot/symbol including an SBFD slot/symbol unless configured or indicated otherwise by the gNB 102.

For example, a first parameter set associated with an OLPC parameter set $\{P_0(i), \alpha(i)\}$ to determine PHR for a reference PUSCH transmission in a slot/symbol may be used by the UE 116 on non-SFBD slots or symbols and a second parameter set associated with an OLPC parameter set $\{P_0(j), \alpha(j)\}$ to determine PHR for a reference PUSCH transmission in a slot/symbol may be used by the UE 116 on SFBD slots or symbols. Parameter sets i or j may be tabulated/specified in system specifications, or a parameter set to determine PHR for a reference PUSCH transmission may be provided by the gNB 102 to the UE 116 using higher layer signaling. The UE 116 may determine a parameter set i or j from a default configuration to determine PHR for a reference PUSCH transmission when a parameter set is not provided.

In one exemplary procedure, a UE is provided a parameter set to determine PHR for a reference PUSCH transmission using a configuration phr-Ref-Pusch-parameters provided by higher layers and associated with a set of slots/symbols. For example, phr-Ref-Pusch-parameters may provide values for MPR, A-MPR, and P-MPR. If the UE 116 determines that a PHR Type 1 for an activated serving cell is based on a reference PUSCH transmission then, for PUSCH transmission occasion i on active UL BWP b of carrier f of serving cell c, the UE 116 computes the PHR Type 1 as, $$PH_{type1,b,f,c}(i, j, q_d, l) = \tilde{P}_{CMAX,f,c}(i) - \{P_{O\_PUSCHb,f,c}(j) + \alpha_{b,f,c}(j) \cdot PL_{b,f,c}(q_d) + f_{b,f,c}(i, l)\} \text{ [dB]}$$

where $\tilde{P}_{CMAX,f,c}(i)$ is computed using parameters by phr-Ref-Pusch-parameters when provided or assuming MPR-0 dB, A-MPR=0 dB, P-MPR=0 dB when not provided.

It is one advantage of the solution that distinct parameter sets to account for different possible transmit power and/or transmit power backoff settings can be used by the UE 116 to determine PHR for non-SBFD/SBFD slot(s)/symbol(s), respectively, or with respect to UL transmissions using different SBFD subband type. In SBFD slot(s)/symbol(s) where the UE 116 may employ different Tx baseband filter settings, the resulting power backoff values different from those in non-SBFD slot(s)/symbol(s) due to baseband filtering design and subband configuration can be set by the network 130 separately.

In one embodiment, a UE determines or selects a PHR format for an actual PUSCH transmission or a transmission based on a reference PUSCH format in a slot/symbol based on a slot/symbol type or based on an SBFD subband type. The UE 116 determines a first PHR format $PHR_1$ for an actual or a reference PUSCH transmission or a second PHR format $PHR_2$ for an actual or a reference PUSCH transmission on a serving cell on non-SBFD slots/symbols and SBFD slots/symbols, respectively. The first PHR format $PHR_1$ for an actual or a reference PUSCH transmission for a serving cell is associated with PUSCH transmissions by the UE 116 in a first set of slots of the serving cell operating SBFD. The second PHR format $PHR_1$ for an actual or a reference PUSCH transmission on a serving cell is associated with PUSCH transmissions by the UE 116 in a second set of slots on the serving cell not operating SBFD. The UE 116 may use a PHR format to provide PHR for actual or reference PUSCH transmission(s) in one or multiple slots where the PHR format may include PHR value(s) and associated PCMAX,f,c value(s) or associated P-MPR value(s).

A PHR format may correspond to a combination of one or more MAC CE field(s), PHR reporting mode(s), associated timer value(s), or a PHR configuration. For example, a first PHR format may be configured for an actual or reference PUSCH transmission on non-SBFD slots using an associated timer value of phr-PeriodicTimer='sf100' and a second PHR format may be configured for an actual or reference PUSCH transmission on SBFD slots using an associated timer value of phr-PeriodicTimer='sf20'. For example, a first PHR format may be configured for an actual or reference PUSCH transmission on non-SBFD slots using pathloss change phr-Tx-PowerFactorChange='dB6' and a second PHR format may be configured for an actual or reference PUSCH transmission on SBFD slots using an associated timer value of phr-PeriodicTimer='sf10'. For example, a first PHR format may be configured for an actual or reference PUSCH transmission on non-SBFD slots using a PH field value and an associated PCMAX,f,c field value and a second PHR format may be configured for an actual or reference PUSCH transmission on SBFD slots using a list or set of PH fields and their associated PCMAX,f,c field for the PHR report on a serving cell. For example, a first PHR format may be assumed by the UE 116 to be for a reference PUSCH transmission on non-SBFD slots using a first parameter set and a second PHR format may be assumed by the UE 116 to be for a reference PUSCH transmission on SBFD slots using a second parameter set.

In one example, a flexible slot/symbol may be used for SBFD operation by the gNB 102. The gNB 102 may provide an SBFD subband configuration to the UE 116 for the flexible symbol/slot. An SBFD subband configuration may include an UL subband or a DL subband. The gNB 102 may schedule a PUSCH transmission from a UE in the flexible symbol/slot. When the UE 116 determines the flexible slot/symbol to be scheduled or configured by the gNB 102 for DL-only, e.g., for non-full-duplex or non-SBFD receptions by the UE 116, the UE 116 determines/selects a first PHR format $PHR_1$ to determine a PHR value for an actual or a reference PUSCH transmission in slot/symbol. When the UE 116 determines the flexible slot/symbol to be scheduled or configured by the gNB 102 for DL receptions and UL transmissions, e.g., for full-duplex or SBFD transmissions and receptions, the UE 116 determines/selects a second PHR format $PHR_2$ to determine a PHR value for an actual or a reference PUSCH transmission in the slot/symbol. When the UE 116 receives a DCI format scheduling a transmission or a reception in a slot/symbol, the UE 116 may determine or select a PHR format using an associated slot/symbol index of the actual or reference PUSCH transmission in that slot or symbol.

In another example, a DL slot/symbol $s_1$ may be used for SBFD operation by the gNB 102. The gNB 102 may provide an SBFD subband configuration to the UE 116 for the DL symbol/slot $s_1$. An SBFD subband configuration may include an UL subband or a DL subband. The gNB 102 may schedule a PUSCH transmission from the UE 116 on the SBFD UL subband of the DL symbol/slot $s_1$. When the UE 116 determines the DL slot/symbol $s_1$ to be scheduled or configured by the gNB 102 for SBFD transmissions from the UE 116 using the UL subband, e.g., for full-duplex or SBFD transmissions and receptions by the gNB 102, the UE 116 selects a first PHR format $PHR_1$ to determine a PHR value for a PUSCH transmission in slot/symbol $s_1$. When the UE 116 determines another slot/symbol $s_2$ to be scheduled or configured by the gNB 102 for PUSCH transmission from the UE 116, e.g., on another full-duplex or SBFD slot/symbol $s_2$ for transmissions and receptions by the gNB 102 or on another non-full-duplex or non-SBFD slot/symbol $s_2$ for receptions by the gNB 102, the UE 116 determines/selects a second PHR format $PHR_2$ to determine a PHR value for a PUSCH transmission in slot/symbol $s_2$. When the UE 116 receives a DCI format scheduling transmission or reception on a slot/symbol, the UE 116 may determine or may select a PHR format using an associated slot/symbol index of the actual or reference PUSCH transmission in that slot or symbol. The principles extend to the case where another slot/symbol $s_2$ used to schedule PUSCH transmissions from the UE 116 is another DL slot/symbol.

The UE 116 may determine or select a PHR format determine a PHR value for a PUSCH transmission on a slot/symbol based on a slot/symbol type in a time period. The slot type may include one or a combination of the following:

- slot or symbol of type D (Downlink), U (Uplink) or F (Flexible) in a TDD common or dedicated UL-DL frame configuration or provided through SFI such as in DCI format 2_0;
- slot or symbol of type 'simultaneous Tx-Rx', 'Rx only', or 'Tx only', e.g., associated with a cell common or a UE dedicated slot and/or symbol configuration providing a resource or transmission type indication;
- slot or symbol associated with a full-duplex UL transmission resource or SBFD UL subband configuration or a full-duplex DL transmission resource or SBFD DL subband configuration; or
- slot or symbol assignment provided to the UE 116 by DCI scheduling.

For example, the UE 116 may determine or select a PHR format using a configured slot or symbol index that is provided as resource type indication by a higher layer parameter in fd-config.

For example, the UE 116 may determine or select a PHR format using a resource type configuration of a serving cell by receiving a system information block (SIB), such as a SIB1, or by a common RRC signaling, or by UE-specific RRC signaling. A resource type indication provided to the UE 116 by higher layers indicates that a slot or symbol or symbol group of the transmission resource may be of type 'simultaneous Tx-Rx', 'Rx only', or 'Tx only'. For example, a transmission resource of type 'simultaneous Tx-Rx', 'Rx only', or 'Tx only' can be provided per slot type 'D', 'U' or 'F' in a slot. For example, the transmission resource may be configured with an SBFD UL and/or DL subband. The indication of the resource type may be provided independently of the transmission direction of a slot or symbol indicated to the UE 116 by the TDD UL-DL frame configuration provided by higher layers.

If the determined slot or symbol type of a slot/symbol for determination of the UL transmit power is 'non-SBFD', the UE 116 determines/selects a first PHR format $PHR_1$. If the determined slot or symbol type of a slot or symbol for determination of the transmit power is 'SBFD', the UE 116 determines/selects a second PHR format $PHR_2$.

A motivation for the above UE behavior is that by determining a slot or symbol as type 'non-SBFD' versus 'SBFD', using the power headroom reporting from the UE 116, a gNB may distinguish between power headroom and associated PHR evaluation assumptions by the UE 116 for slots/symbols where only UL receptions occur and for slots/symbols where both DL transmissions and UL receptions by the gNB 102 may occur. Accordingly, the gNB 102 can select and provide separate power control parameters and settings to the UE 116 which are adapted to the CLI conditions and the gNB 102 SIC implementation constraints to adjust or control the transmit power of PUSCH transmissions on the full-duplex or SBFD slot/symbol.

Figure 14:
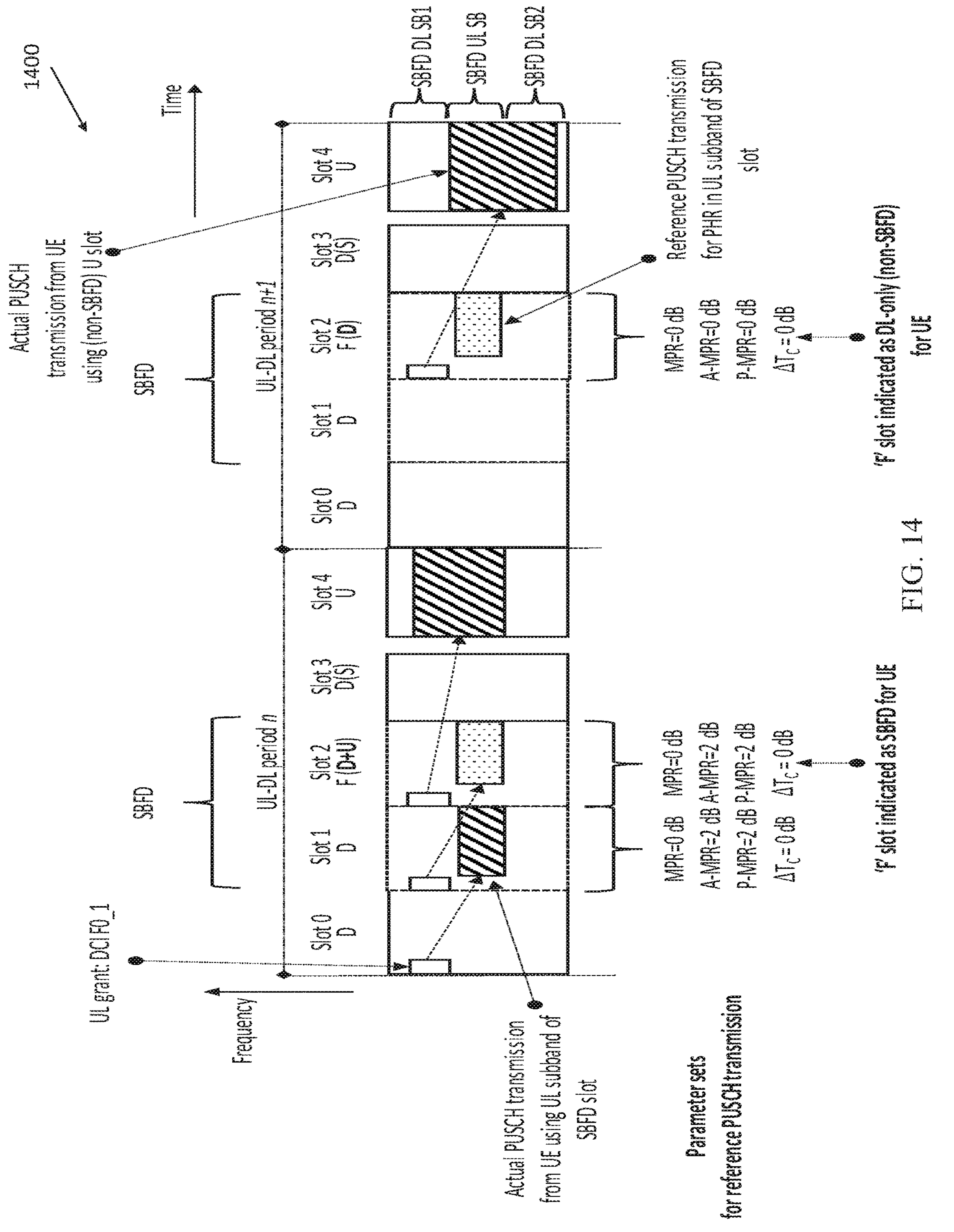
FIG. 14 illustrates a timeline for an actual PUSCH transmission/transmission based on a reference PUSCH format according to embodiments of the present disclosure.

FIG. 14 illustrates a timeline 1400 for an actual PUSCH transmission/transmission based on a reference PUSCH format according to embodiments of the present disclosure. For example, timeline 1400 for an actual PUSCH transmission/transmission based on a reference PUSCH format can be followed by any of the UEs 111-116 of FIG. 1. This example is for illustration only and other embodiments can be used without departing from the scope of the present disclosure.

Figure 15:
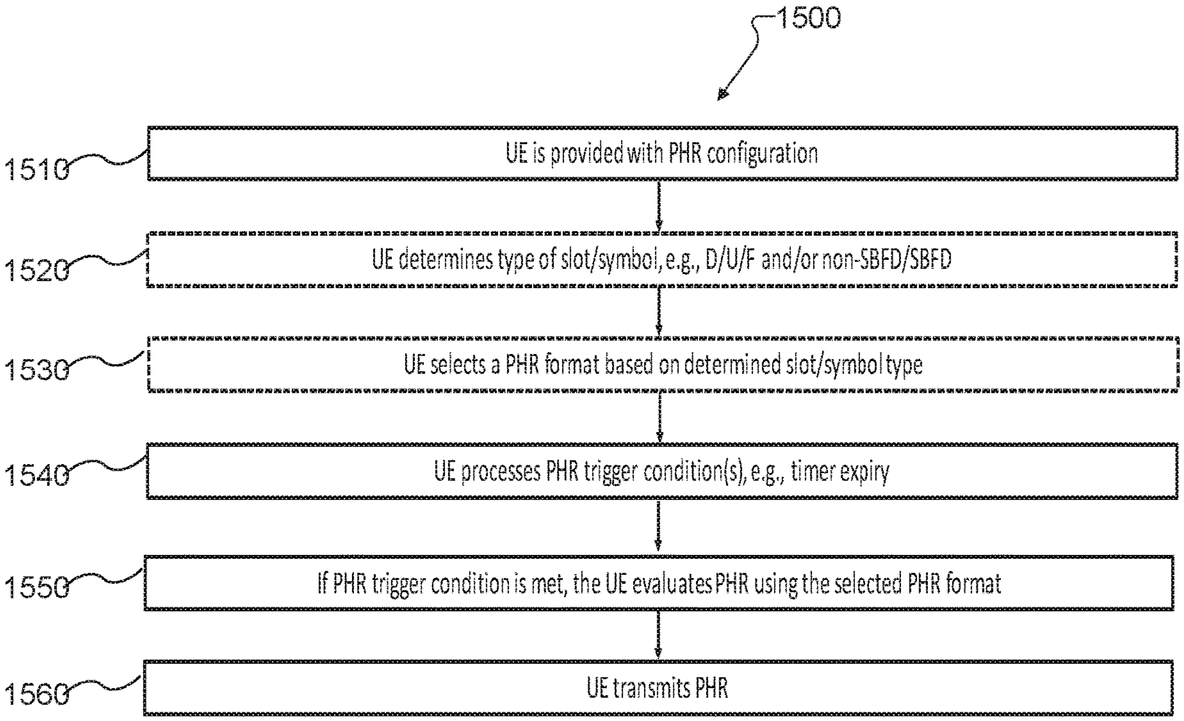
FIG. 15 illustrates a flowchart of an example UE procedure for an actual PUSCH transmission/transmission based on a reference PUSCH format according to embodiments of the present disclosure.

FIG. 15 illustrates a flowchart of an example UE procedure 1500 for an actual PUSCH transmission/transmission based on a reference PUSCH format according to embodiments of the present disclosure. For example, UE procedure 1500 for an actual PUSCH transmission/transmission based on a reference PUSCH format can be performed by the UE 116 of FIG. 3. This example is for illustration only and other embodiments can be used without departing from the scope of the present disclosure.

The procedure begins in 1510, a UE is provided with PHR configuration. In 1520, the UE 116 determines the type of slot/symbol, e.g., D/U/F and/or non-SBFD/SBFD. In 1530, the UE 116 selects a PHR format based on determines slot/symbol type. In 1540, the UE 116 processes PHR trigger condition(s), e.g., timer expiry. In 1550, if PHR trigger condition is met, the UE 116 evaluates PHR using the selected PHR format. In 1560, the UE 116 transmits PHR.

Any of the above variation embodiments can be utilized independently or in combination with at least one other variation embodiment. The above flowchart illustrates example methods that can be implemented in accordance with the principles of the present disclosure and various changes could be made to the methods illustrated in the flowchart herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method of operating a user equipment (UE), the method comprising:
- receiving first information for a first set of parameters for a first power headroom report (PHR) associated with a first subset of slots from a set of slots on a cell;
- receiving second information for a second set of parameters for a second PHR associated with a second subset of slots from the set of slots on the cell, wherein the first set of parameters and the second set of parameters are associated with uplink (UL) transmit power;
- determining a power for transmission of a physical uplink shared channel (PUSCH) in a slot from the set of slots;
- determining the first PHR for the power based on the first set of parameters in response to the slot being from the first subset of slots;
- determining the second PHR for the power based on the second set of parameters in response to the slot being from the second subset of slots; and
- transmitting a medium access control (MAC) control element (CE) including the first PHR or the second PHR based on whether a reporting condition is met,
- wherein the first subset of slots does not include time-domain resources indicated for simultaneous transmission and reception on the cell, and
- wherein the second subset of slots includes time-domain resources indicated for the simultaneous transmission and reception on the cell.

2. The method of claim 1, wherein:
- the reporting condition is met (i) in response to a reporting timer expiring or (ii) in response to a change in pathloss value or a change in power management maximum power reduction (P-MPR) value being equal to or larger than a threshold value, and
- the reporting condition is not met when a prohibit timer is not expired.

3. The method of claim 1, wherein:
- the slot is from the second subset of slots and the PUSCH is an actual PUSCH or a virtual PUSCH; and
- determining the first PHR or the second PHR for the power further comprises determining the second PHR for transmission of the actual PUSCH or the virtual PUSCH in the slot from the second subset of slots.

4. The method of claim 1, further comprising:
- selecting, based on the slot for transmission of the PUSCH, a timer value from a plurality of timer values for the reporting condition,
- wherein the plurality of timer values are provided in the first set of parameters or the second set of parameters.

5. The method of claim 1, wherein:
the PUSCH is a virtual PUSCH,
the method further comprises selecting, based on the slot for transmission of the virtual PUSCH, a value from a plurality of values for one of a transmission power, a maximum power reduction, or a power-control parameter, and
the plurality of values are provided in the first set of parameters or the second set of parameters.

6. The method of claim 1, wherein:
determining the first PHR or the second PHR for the power further comprises determining, based on a type of symbols in the second subset of slots, the second PHR,
the type of symbols is one of a downlink (DL) symbol, an uplink (UL) symbol, or a flexible symbol.

7. The method of claim 1, further comprising:
receiving third information enabling or disabling the first PHR for the transmission of the PUSCH in the slot from the first subset of slots; and
receiving fourth information enabling or disabling the second PHR for the transmission of the PUSCH in the slot from the second subset of slots,
wherein the reporting condition is not met in response to a slot being disabled.

8. A user equipment (UE) comprising:
a transceiver configured to:
receive first information for a first set of parameters for a first power headroom report (PHR) associated with a first subset of slots from a set of slots on a cell, and
receive second information for a second set of parameters for a second PHR associated with a second subset of slots from the set of slots on the cell, wherein the first set of parameters and the second set of parameters are associated with uplink (UL) transmit power; and
a processor operably coupled with the transceiver, the processor configured to:
determine a power for transmission of a physical uplink shared channel (PUSCH) in a slot from the set of slots,
determine the first PHR for the power based on the first set of parameters in response to the slot being from the first subset of slots, and
determine the second PHR for the power based on er the second set of parameters in response to the slot being from the second subset of slots,
wherein the transceiver is further configured to transmit a medium access control (MAC) control element (CE) including the first PHR or the second PHR based on whether a reporting condition is met,
wherein the first subset of slots does not include time-domain resources indicated for simultaneous transmission and reception on the cell, and
wherein the second subset of slots includes time-domain resources indicated for the simultaneous transmission and reception on the cell.

9. The UE of claim 8, wherein:
the reporting condition is met (i) when a reporting timer expires or (ii) when a change in pathloss value or a change in power management maximum power reduction (P-MPR) value is equal to or larger than a threshold value, and
the reporting condition is not met when a prohibit timer is not expired.

10. The UE of claim 8, wherein:
the slot is from the second subset of slots and the PUSCH is an actual PUSCH or a virtual PUSCH, and
the processor is further configured to determine the second PHR for transmission of the actual PUSCH or the virtual PUSCH in the slot from the second subset of slots.

11. The UE of claim 8, wherein:
the processor is further configured to select, based on the slot for transmission of the PUSCH, a timer value from a plurality of timer values for the reporting condition, and
the plurality of timer values are provided in the first set of parameters or the second set of parameters.

12. The UE of claim 8, wherein:
the PUSCH is a virtual PUSCH,
the processor is further configured to select, based on the slot for transmission of the virtual PUSCH, a value from a plurality of values for one of a transmission power, a maximum power reduction, or a power-control parameter, and
the plurality of values are provided in the first set of parameters or the second set of parameters.

13. The UE of claim 8, wherein:
the processor is further configured to determine, based on a type of symbols in the second subset of slots, the second PHR, and
the type of symbols is one of a downlink (DL) symbol, an uplink (UL) symbol, or a flexible symbol.

14. The UE of claim 8, wherein:
the transceiver is further configured to:
receive third information enabling or disabling the first PHR for the transmission of the PUSCH in the slot from the first subset of slots, and
receive fourth information enabling or disabling the second PHR for the transmission of the PUSCH in the slot from the second subset of slots, and
the reporting condition is not met when a slot is disabled.

15. A base station (BS) comprising:
a processor; and
a transceiver operably coupled with the processor, the transceiver configured to:
transmit first information for a first set of parameters for a first power headroom report (PHR) associated with a first subset of slots from a set of slots on a cell,
transmit second information for a second set of parameters for a second PHR associated with a second subset of slots from the set of slots on the cell, wherein the first set of parameters and the second set of parameters are associated with uplink (UL) transmit power, and
receive, based on whether a reporting condition is met, a medium access control (MAC) control element (CE) including the first PHR or the second PHR for a power for a physical uplink shared channel (PUSCH) in a slot from the set of slots,
wherein the first PHR is based on (i) the first set of parameters in response to the slot being from the first subset of slots and the second PHR is based on the second set of parameters in response to the slot being from the second subset of slots,
wherein the first subset of slots does not include time-domain resources indicated for simultaneous transmission and reception on the cell, and
wherein the second subset of slots includes time-domain resources indicated for the simultaneous transmission and reception on the cell.

16. The BS of claim 15, wherein:

the reporting condition is met (i) when a reporting timer expires or (ii) when a change in pathloss value or a change in power management maximum power reduction (P-MPR) value is equal to or larger than a threshold value, and the reporting condition is not met when a prohibit timer is not expired.

17. The BS of claim 15, wherein:

the slot is from the second subset of slots and the PUSCH is an actual PUSCH or a virtual PUSCH, and the second PHR is for the actual PUSCH or the virtual PUSCH in the slot from the second subset of slots.

18. The BS of claim 15, wherein:

a timer value for the reporting condition is based on the slot for transmission of the PUSCH, and a plurality of timer values including the timer value are provided in the first set of parameters or the second set of parameters.

19. The BS of claim 15, wherein:

the PUSCH is a virtual PUSCH, a value for one of a transmission power, a maximum power reduction, or a power-control parameter is based on the slot for transmission of the virtual PUSCH, and a plurality of values including the value are provided in the first set of parameters or the second set of parameters.

20. The BS of claim 15, wherein:

the transceiver is further configured to:

transmit third information enabling or disabling the first PHR for the PUSCH in the slot from the first subset of slots, and transmit fourth information enabling or disabling the second PHR for the PUSCH in the slot from the second subset of slots, and the reporting condition is not met when a slot is disabled.

* * * * *